Oct. 27, 1931.  A. M. ROSSMAN  1,828,945
TROLLEY SYSTEM FOR ELECTRIC RAILWAYS
Filed April 23, 1929   19 Sheets-Sheet 2

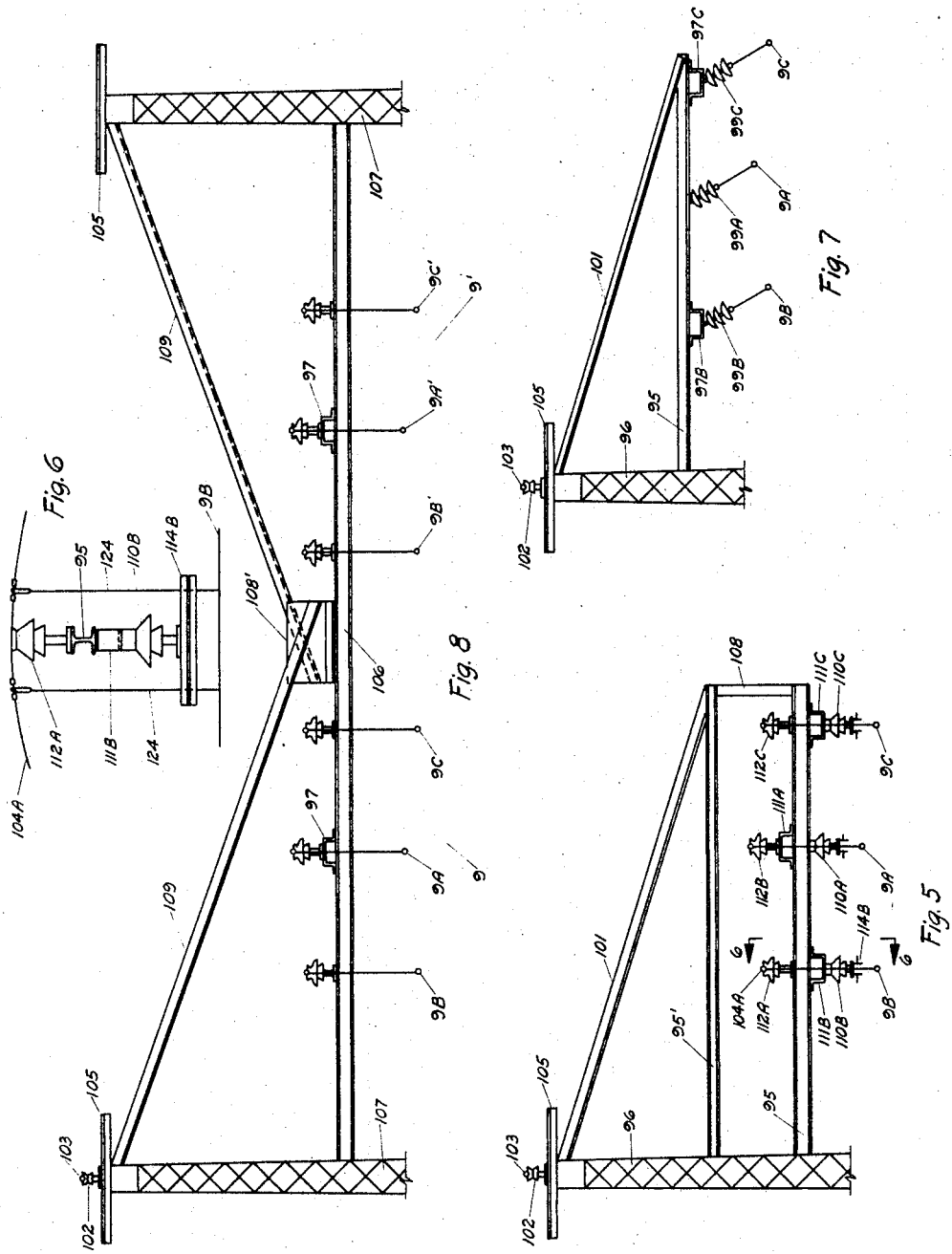

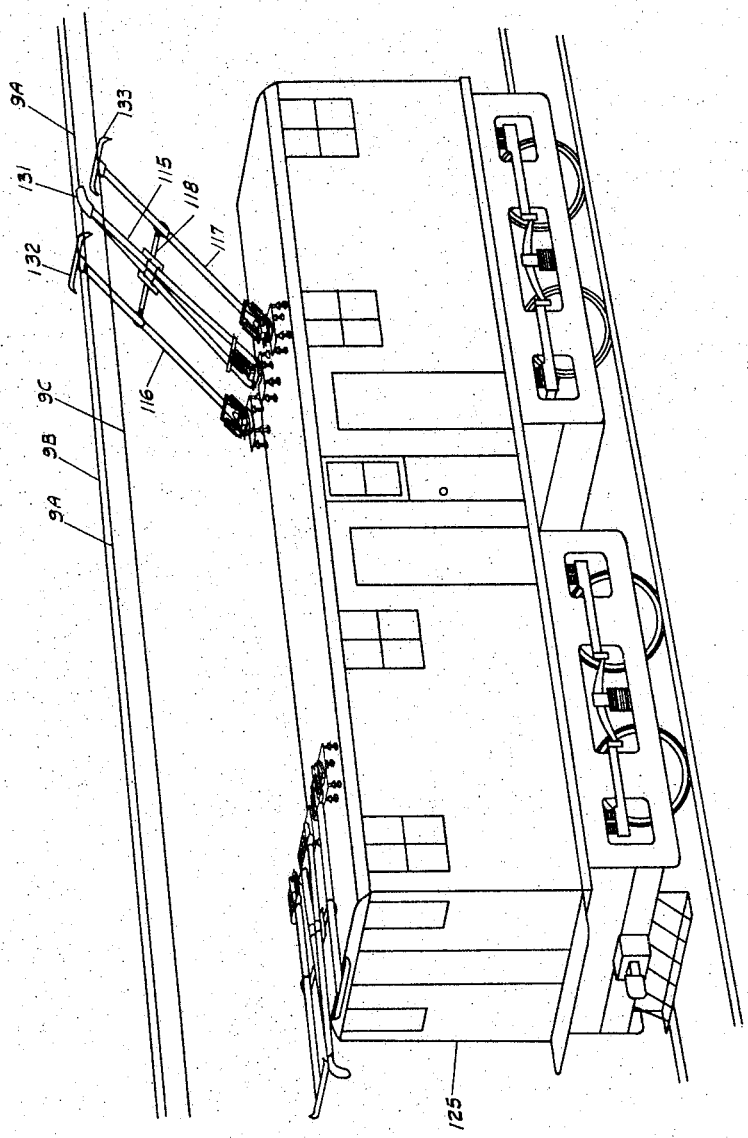

Oct. 27, 1931.　　　A. M. ROSSMAN　　　1,828,945
TROLLEY SYSTEM FOR ELECTRIC RAILWAYS
Filed April 23, 1929　　　19 Sheets-Sheet 7
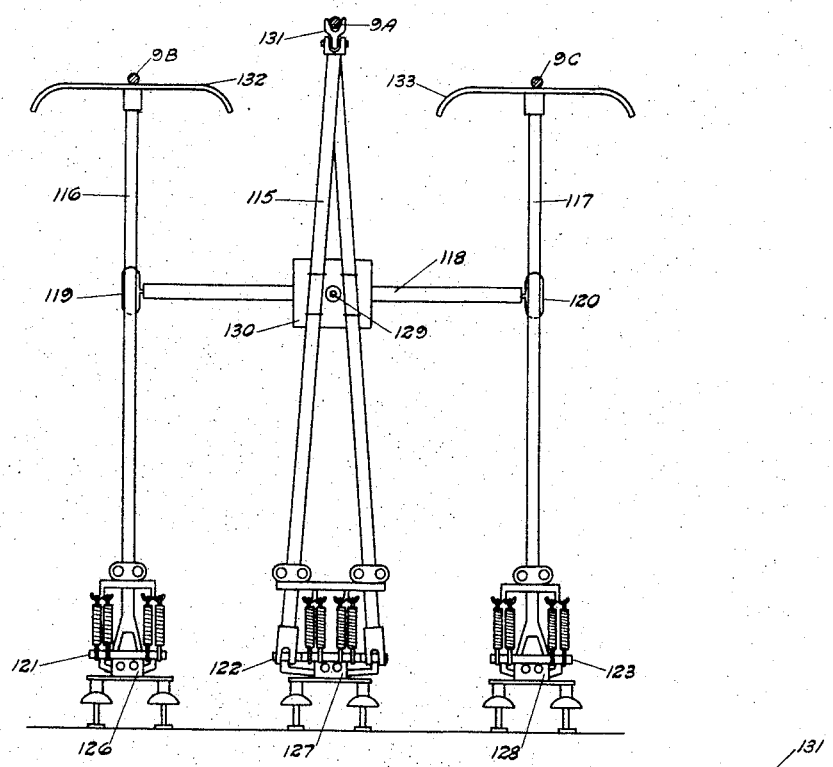
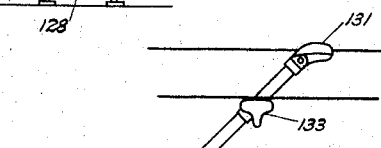
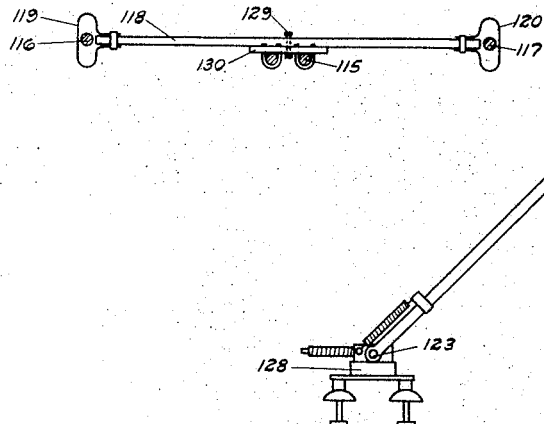
Inventor
Allen M. Rossman
By Brown, Jackson, Boettcher & Wiener
Attys.

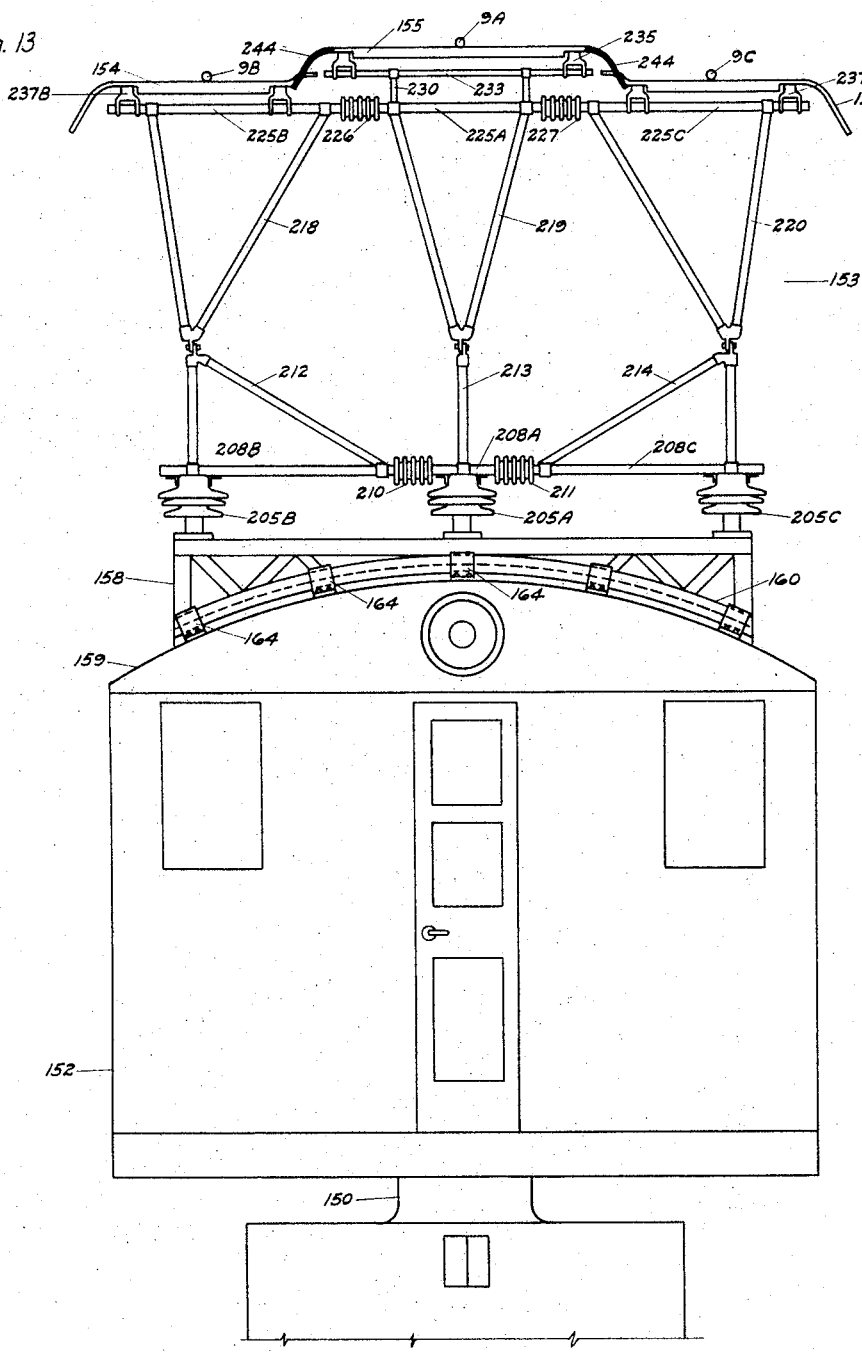

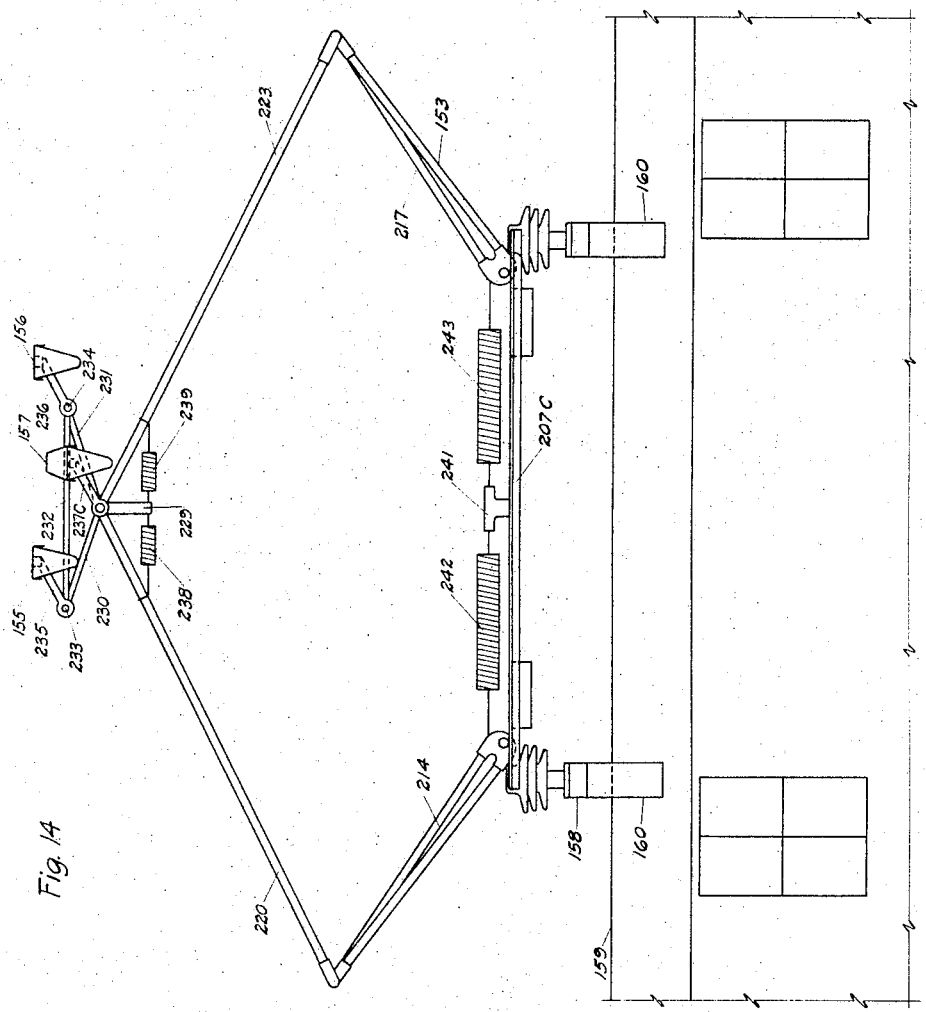

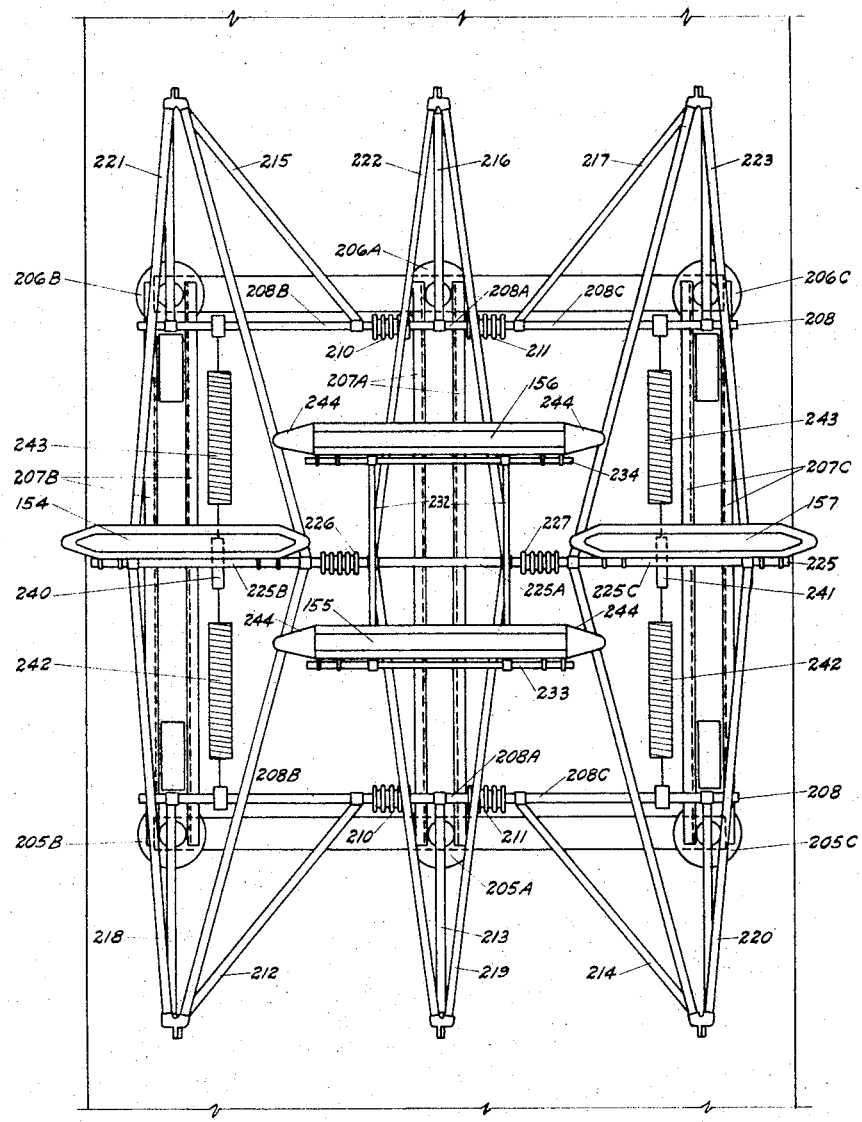

Oct. 27, 1931. A. M. ROSSMAN 1,828,945
TROLLEY SYSTEM FOR ELECTRIC RAILWAYS
Filed April 23, 1929 19 Sheets-Sheet 11

Inventor
Allen M. Rossman
By Brown, Jackson, Boettcher + Dienner
Attys.

Oct. 27, 1931.  A. M. ROSSMAN  1,828,945
TROLLEY SYSTEM FOR ELECTRIC RAILWAYS
Filed April 23, 1929   19 Sheets-Sheet 16

Inventor
Allen M. Rossman
By Brown, Jackson, Boettcher & Dienner
Attys.

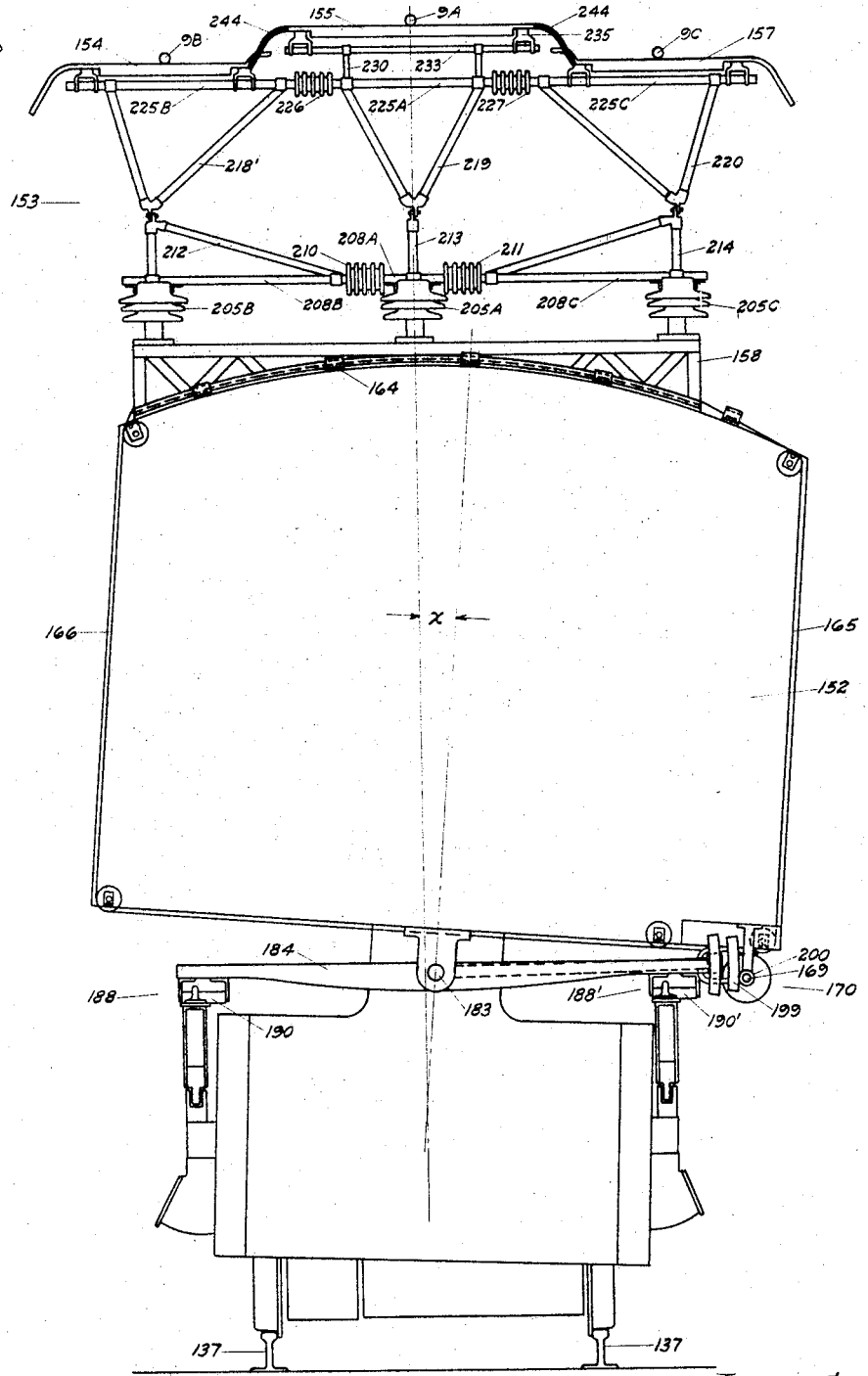

Oct. 27, 1931.     A. M. ROSSMAN     1,828,945
TROLLEY SYSTEM FOR ELECTRIC RAILWAYS
Filed April 23, 1929     19 Sheets-Sheet 18
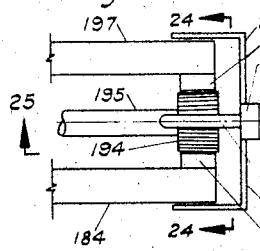
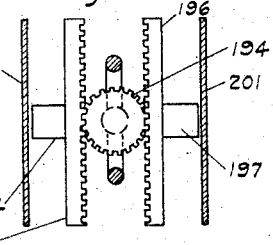
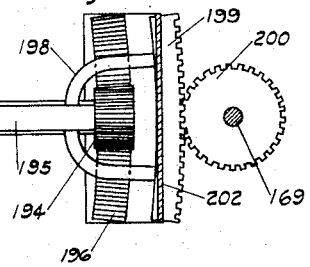
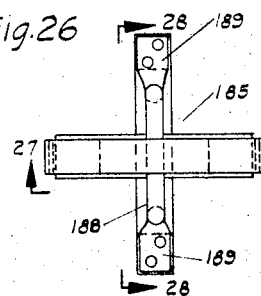
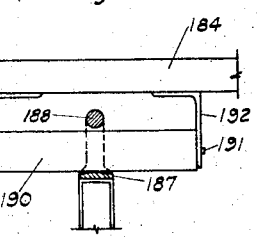
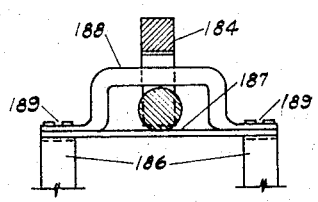
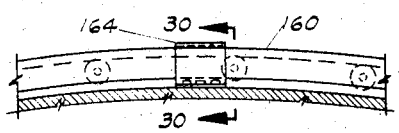
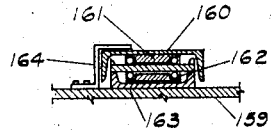
Inventor
Allen M. Rossman
By Brown, Jackson, Boettcher & Dienner
Att'ys.

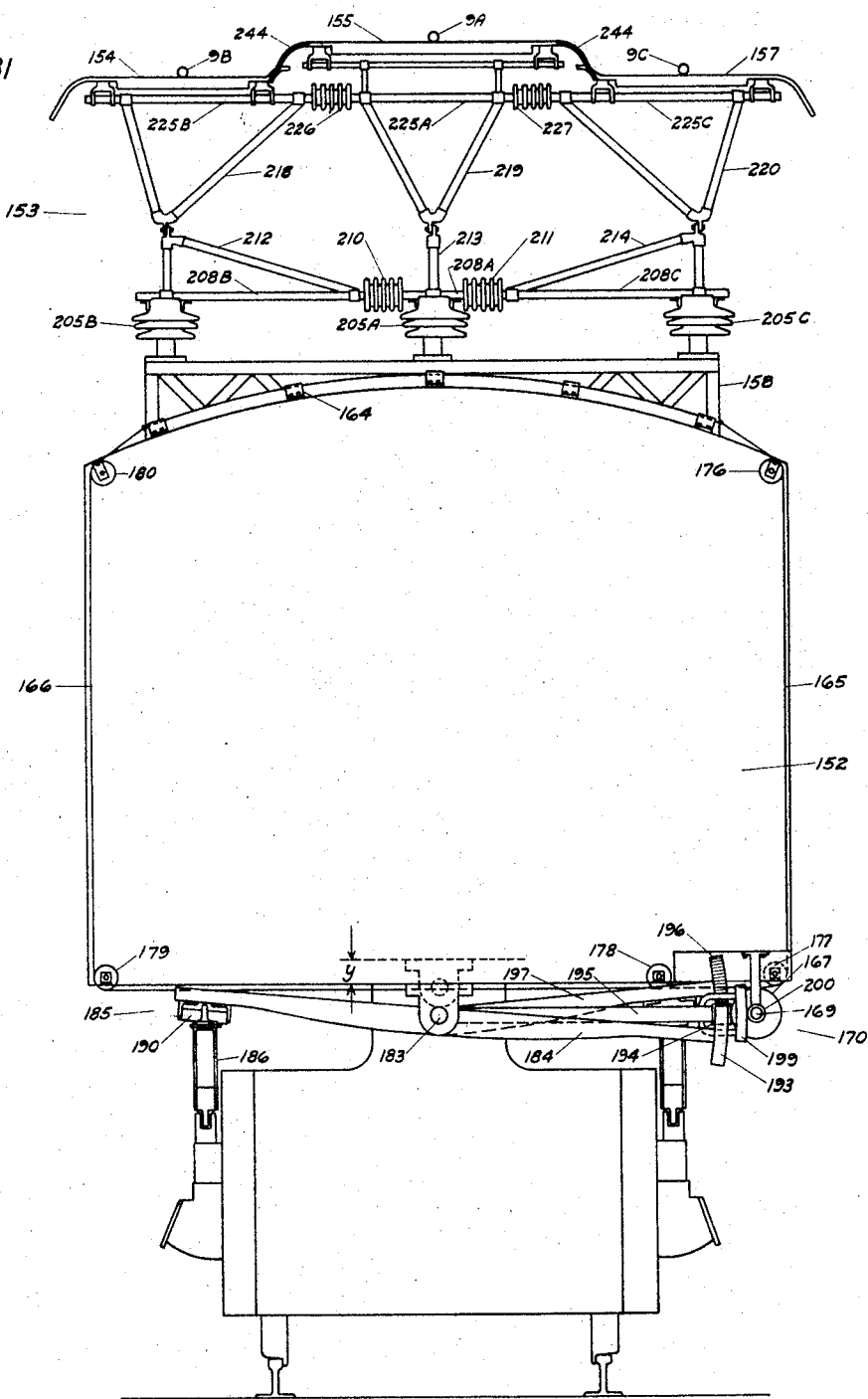

Patented Oct. 27, 1931

1,828,945

UNITED STATES PATENT OFFICE

ALLEN M. ROSSMAN, OF CHICAGO, ILLINOIS, ASSIGNOR, BY MESNE ASSIGNMENTS, TO ROSSMAN PATENTS, INCORPORATED, OF CHICAGO, ILLINOIS, A CORPORATION OF ILLINOIS

TROLLEY SYSTEM FOR ELECTRIC RAILWAYS

Application filed April 23, 1929. Serial No. 357,538.

My invention relates to electric railways and the like, and the present application is directed more specifically to the trolley and current collector cooperating therewith, of a new electric railway system shown more in detail in my copending application, Serial No. 365,832, filed May 25, 1929.

The system of which the present invention is a part in its preferred form comprehends the use of three phase sixty cycle alternating current. In this it is essentially different from known systems which in general have heretofore been either twenty-five cycle alternating current single phase or direct current systems.

An essential part of the preferred motor system to be used in conjunction with the three phase trolley resides in the use of three phase alternating current induction motors for the main power units, said units being supplemented by auxiliary direct current motors to provide the necessary starting torque and speed change.

The direct current motors employ as a maximum only a relatively small part, in the preferred form, of the order of 20 to 25 per cent of the total power of the motor system. This power is secured by conversion of a part of the alternating current power through a converter carried in the locomotive, preferably a motor generator set because it forms a reversible link. The mechanism and means for securing the desired reversible electro-mechanical transformation is described and claimed in my copending application Serial No. 360,400, filed May 4, 1929.

For crossovers, switch yards and the like, herein termed track intersections, single phase trolley is employed. The primary source of power is three phase alternating current but for such local use or special use as yards, crossovers, switches and the like power from one phase conductor to neutral which is termed herein broadly single phase is used where the complications of three phase trolley are not desirable.

The locomotive is provided with suitable automatic changeover mechanism controlled by track contacts to switch from three phase to single phase and vice versa, disclosed and claimed in my copending application Serial No. 357,539, filed April 23, 1929.

Whereas the preferred use for the trolley system of my invention is in connection with the above described alternating current and direct current motor combination it is to be understood that I do not intend to limit the invention to the employment of the specific form of energy conversion or motor drive above referred to but my present invention is applicable to all situations where it is desired to employ three phase trolley or a combination three phase and single phase trolley.

In the electric railway system of my invention the primary object is to employ three phase 60 cycle current as the power supply in order to be able to receive power from the network of power supply lines and generating systems available throughout substantially the entire country. By employing the commercial frequency 60 cycle current upon the trolley power may be taken from any convenient source. Special substations or converting machinery are not required. By locating transformers along the right of way the trolley may be tied in to either a paralleling transmission line or to sources of current wherever available.

Heretofore the use of 60 cycle current has been considered out of the question for two chief reasons, first, because no feasible way has heretofore been worked out that would economically apply such current to the driving axles. This means not only the application of power to drive the train particularly at reduced speeds but also regeneration upon braking or descending grades. This difficulty of an economical and practical application of 60 cycle power has been solved by the combined direct current and alternating current drive disclosed in my copending application Serial No. 360,400.

The second obstacle in the use of commercial 60 cycle current has been the difficulty of supplying the same to the moving motor car. That is to say, so far as I am aware no one ever worked out a practical trolley system for 60 cycle current.

And certainly, no one so far as I can find has ever provided a trolley system suitable for three phase operation at any frequency. The present application discloses a trolley system suitable for three phase 60 cycle operation.

Now, coming to the crux of the whole system, my system of drive—that is my motor system—has the ability to operate single phase, i. e., between two phase conductors or from a phase conductor to neutral. In the preferred form of my invention I employ the latter. The motor system having the ability to operate on three phase or single phase and the three phase trolley on main lines and single phase operation through track intersections and in terminals and yards provides a wholly new system, which meets present requirements for a universal system of electrification. This system has to a large degree the desirable characteristics of both the known D. C. system and the alternating current single phase system without the main drawbacks of either.

An important part of the problem of the trolley system is the current collector system. In the preferred form of my invention this takes the form of a pantograph.

Because of the high voltage that may be employed on the trolley—for example 13,500 volts, the amount of current to be collected is comparatively small. For example, with a three phase 13,200 volt system—100 amperes for collector at 85% power factor provides 1,950 kilowatts.

In comparison 100 amperes at 3,000 volts D. C. provides only 300 kilowatts, 650 amperes being required to provide 1,950 kilowatts. The alternating current collectors may, therefore, be of comparatively light construction.

A pantograph supported in the usual manner is not well adapted to the present system because the lateral movement of the three collector pans with reference to the trolley wires would be greater than desirable. To overcome this difficulty I provide a pantograph support and a cooperating compensating device which practically neutralize the effect of sidesway of the body of the locomotive or motor car. The pantograph thus equipped follows the natural straight line course determined by its inertia rather than the usual zig-zag course forced on the rigidly mounted pantograph by the swaying of the locomotive body.

By thus eliminating the effect of sidesway the length of the collector pans may be reduced so that these pans may be mounted in the space usually alloted to a single pan.

The compensating device translates the angular variation of position of the locomotive body from normal position, i. e., parallel to the axles, into a motion of the pantograph with respect to the roof of the car. The compensating device is not disturbed by vertical motion of the car or locomotive body.

The compensating device may with advantage be applied to single phase operation or to any form of current collection device. According to this form of collector the trolley wires are lined up with respect to the rails and the collector shoes are guided in respect to the rails regardless of the position of the locomotive body.

In another embodiment of my invention I employ a current collector which is guided by one of the trolley wires so as to hold the collecting shoes of the three phases in register with the phase conductors respectively.

In this form of the invention the central collector shoe is the controlling shoe for guiding the other shoes into register with their trolley wires. In both forms the central shoe is a controlling shoe which limits the rise of the other shoes to a predetermined limit. As the trolley approaches crossovers and the like where conversion of the system from three phase to single phase occurs the outer or auxiliary phase conductors which form the outer trolley wires are trained upwardly by suitable supporting means to a position above the central wire and above the collecting shoes. The central collecting shoe continues on the same level in engagement with the central or control trolley wire.

Thus for separting the two outer collecting shoes from the outer phase conductors the simple expedient of inclining the outer trolley wires upwardly to a point where they lose contact with the outer trolley shoes is employed.

This is done without changing the height of the collector as a whole and hence the switch-over from three phase to single phase for the crossover or switch or the like is made readily at any speed of the locomotive without jar or strain upon the trolley and the like.

Since the trolley is operated on three phase 60 cycle alternating current in the preferred form, current supply from any suitable source may be connected to the trolley system. That is to say, the current supply for the electric railroad is available wherever there is a source of commercial three phase 60 cycle alternating current. The use of special substations is thereby avoided and separate transmission lines are not necessary except where no other source is available. The trolleys themselves become transmission lines since at the crossovers, switch yards, and the like, the trolley while discontinued as a three phase trolley is actually continued as a three phase transmission line. The trolley, therefore, assumes the novel aspect of a transmission line throughout the system.

Now in order to acquaint those skilled in the art with the manner of constructing and operating a device embodying my invention I shall describe in connection with the accompanying drawings a specific embodiment of the invention.

In the drawings:

Fig. 5 is a sectional view showing the manner of mounting the three phase trolley conductors and the neutral conductor and holding the same against lateral motion.

Fig. 6 is a fragmentary section taken on the line 6—6 of Fig. 5.

Fig. 7 is a cross sectional view showing the manner of supporting the trolley on a curve as shown in isometric view in Fig. 4.

Fig. 8 shows an installation for a two track or double track system.

Fig. 9 is an isometric view of a locomotive showing one form of current collector mounted on the locomotive and cooperating with the trolley conductor.

Fig. 10 is a front elevational view of the current collector shown on the locomotive of Fig. 9.

Fig. 11 is a side elevational view of the same.

Fig. 12 is a section taken on the line 12—12 of Fig. 11.

Fig. 13 is a front elevational view of the locomotive bearing a pantograph trolley of my invention.

Fig. 14 is a side elevational view of the same.

Fig. 15 is a top plan view of the collector shown in Figs. 13 and 14.

Fig. 22 is an end view of the locomotive illustrating the effect of tilting the body and showing the operation of the equalizer or compensating device in maintaining the pantograph central.

Fig. 23 is a top plan view of the compensating mechanism.

Fig. 24 is a section taken on the line 24—24 of Fig. 23.

Fig. 25 is a sectiton taken on the line 25—25 of Fig. 23.

Fig. 26 is a fragmentary plan view of the linkage between the compensator arms and the fulcrums of the device which are stationary with respect to the car axles.

Fig. 27 is a section taken on the line 27—27 of Fig. 26.

Fig. 28 is a section taken on the line 28—28 of Fig. 26.

Fig. 29 is a side view of the guiding track for supporting the pantograph carriage.

Fig. 30 is a section taken on the line 30—30 of Fig. 29; and

Fig. 31 is an end view of the locomotive showing how the compensating or equalizing device neutralizes the effect of vertical motion of the locomotive body.

Figure 1:
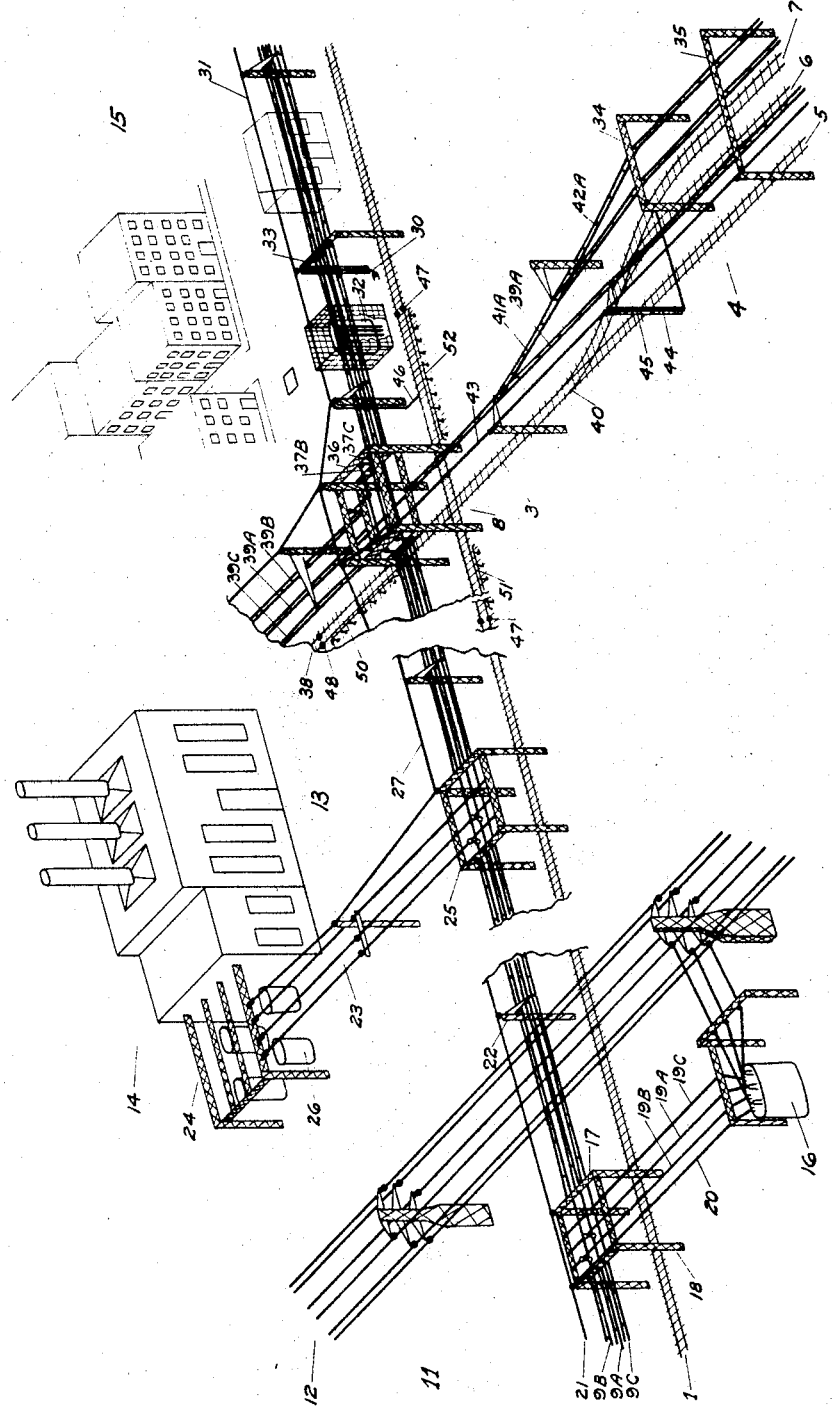
Fig. 1 is an isometric view of a railway system employing the trolley of my invention.

Referring now to Fig. 1, I have shown diagrammatically the trolley and supply system therefor in connection with the railroad track. Assuming that the railroad track 1 is a track of standard gage and suitable for operation of standard railroad cars, this track is not changed and need not be bonded except at track intersections where neutral return occurs through the rails.

Figure 3:
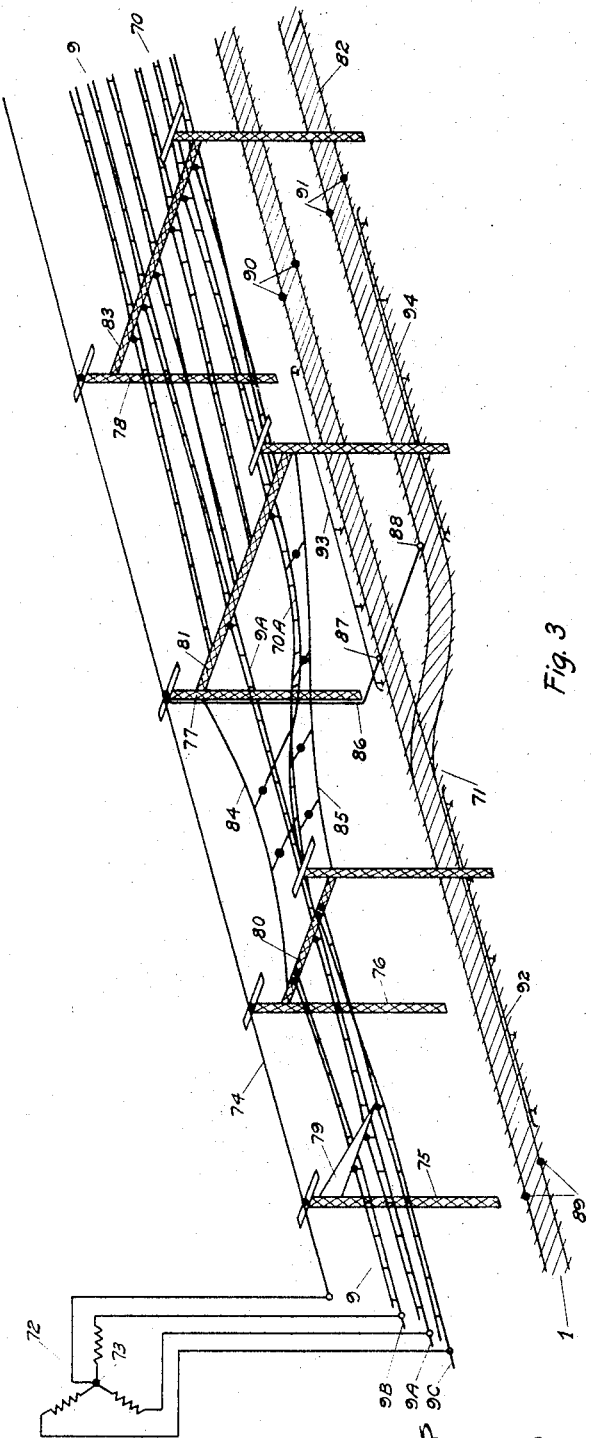
Fig. 3 is a like isometric view of a switch or turnout on an electric railway system embodying the trolley of my invention.

The trolley system 2 is a three phase trolley for the main line track. An intersecting or crossing track 3 is indicated at the right of Fig. 3 and a part of the same branches into a yard or terminal 4—4, formed of the three tracks 5, 6 and 7.

The main line track 1 on each side of the intersection 8 is provided with three phase trolley comprising three trolley wires 9A, 9B and 9C. The trolley wires are suspended by messenger wires such as are at present employed to form the usual catenary suspension of trolley wires for high speed operation.

The electric railway shown in Fig. 1 is shown as extending from a region 11 where a transmission line 12 is available to a region 13 where the power station 14 is available and into a metropolitan district 15 where an underground net work is available for supplying three phase power to the system.

As shown in the region 11, the three phase high tension line 12 is connected through a transformer or bank of transformers 16 to the trolley wires 9. A suitable elevated frame 17 mounted on posts 18 provides the means for making the span of conductors from the trolley to the transformer 16. The elevated frame 17 serves as a suitable dead ending structure for the catenary or messenger cables along each side thereof and wires 19A, 19B and 19C are suitably supported on insulators and connected to the trolley conductors 9A, 9B and 9C within said open frame 17. Conductor 20 is the neutral return connected to the neutral of the secondary winding of the three phase transformer 16 and connected to the overhead neutral wire 21. The neutral wire 21 is supported upon insulators on the frame 17 and upon towers such as 22 along the right of way, which towers serve to support the trolley.

It is to be observed that the three phase trolley conductors are so closely spaced that substantially no inductive disturbance is created thereby, these wires being spaced preferably on three foot centers with the central wire elevated a distance of from six to nine inches above the two outer trolley wires which are suspended on substantially a common level. This six to nine inches elevation is for mechanical clearance of the collector at crossings, switches and the like.

The current flowing through the neutral conductor 21 is that which is employed at the track intersections in the main line or in yards or terminals. Hence, on main line tracks, the amount of single phase or phase to neutral currents flowing in the conductor 21 is not great. Also, the effect of current flow in the neutral conductor may be localized where extensive use of the same is made, as for instance, in yards or the like, by restricting said neutral conductor to relatively short length by providing a local source of power, that is, a transformer adjacent the crossover, yard or terminal.

In the region 13, the trolley is supplied with current from the generating station 14 by extending a line, such as 23, including three phases and a neutral connection, from the transformers at the switch yard 24 of the generating station 14. By using the tower structure 25, as described in connection with the transformer 16, connections from the transformer 26 of the power station 14 to the trolley wires and to the neutral conductor 27 may suitably be made. Where underground transmission occurs, the cable may be brought out to overhead wires, as indicated at 30 at the right of Figure 1, and suitable connection be made to the three trolley conductors and to the neutral conductor 31, which is supported on the towers or poles.

The underground network of the metropolitan area 15 is connected through a transformer 32 and the connections may all be disposed underground or the transformer may be set out within a guarded enclosure to facilitate cooling as shown.

Where the connection 30 is made through the three phase trolley, an overhead bridge 33, supported on towers or posts, is employed. Such bridge may be employed for multiple tracks, as indicated, for example, at 34 and 35 in the yard or terminal 4.

At the track intersection 8, a double deck frame 36 is provided. This frame serves the double purpose of providing an anchor for the messenger wires, which form the catenary suspensions for the trolley wires 9A, 9B, and 9C, and also it serves to support insulators for looping the two outer trolley wires over the track intersections. These two looped conductors, which form continuations of the two outer trolley wires, are shown at 37B and 37C, supported in insulated relation upon the elevated frame 36.

The main line part of the intersecting track 3 is indicated at 38 and it has the three phase trolley extending over it. The central trolley wire 39A is disposed at a level above the two outer trolley wires 39B and 39C, as in the case of the main line track 1, and the outer trolley wires 39B and 39C are connected to the outer trolley wires 9B and 9C, respectively, by conductors supported on the tower 36.

For the intersecting part of the cross track 3 and for the yards 4, the central trolley wire 39A is continued at the same level over the track 5, being supported on a suitable catenary suspension.

At the point 40 in the track 3, where the branch track intersects the straight track 5, a branch trolley wire 41A is connected to the trolley wire 39A and, likewise, where the track 7 intersects the track 6, another branch trolley wire 42A is connected to the trolley wire 41A. In this manner, by a single trolley wire, power is supplied for operating the motor cars, locomotives, and the like in the yard and across the intersection. The neutral conductor 43, which is joined to the neutral conductor 31, has a connection 44 extending down along the post 45 and this conductor 44 is connected to the track rails of the tracks 5, 6 and 7 on the track 3. Likewise, the neutral wire 31 is connected by a connection 46 to a section of the track 1. The section of the main line track 1 adjacent the crossing 8 is insulated from the remainder of the main line track as by the insulating joints indicated at 47 and, likewise, insulating joints are interposed at the point 48 adjacent the crossover on the track 3, so as to confine the single phase current to a relatively small compass.

At the approach to the crossover, where single phase operation is to be carried on, track contacts such as 50, 51 and 52, are located for causing changeover of the mechanism of the locomotive from three phase to single phase and for controlling the change back from single phase to three phase. These track contacts 50, 51 and 52 are preferably connected to the track rails, so that a contact shoe carried by the locomotive may engage the same and establish a circuit through the locomotive frame for a control relay disclosed in my copending application Serial No. 357,539 for causing a switchover or switchback, as the case may be.

The controlling mechanism is of a character that, after it is switched to single phase, it will remain so until three phase current is again supplied. Hence, after once entering the yard zone, as indicated at the lower right hand of Fig. 1, the locomotive remains switched to single phase connection and operates accordingly.

Figure 2:
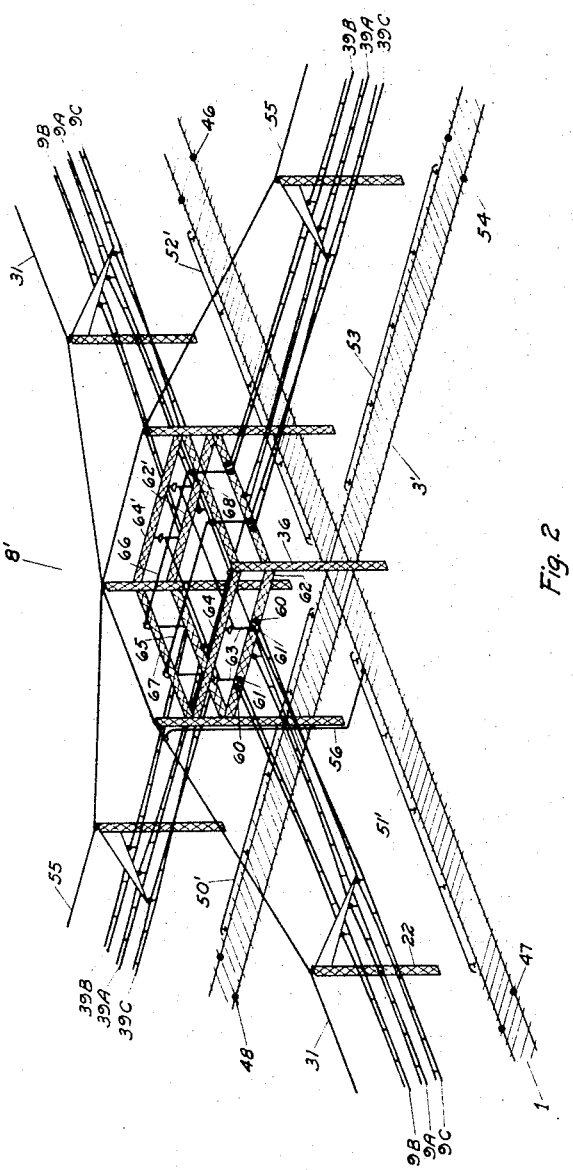
Fig. 2 is a similar view of a crossover where two lines of electric railway embodying the trolley system of my invention cross each other. This illustrates also the track contact for controlling changeover from three phase to single phase.

In Fig. 2 I have shown in greater detail the crossover arrangement for two main line intersecting tracks. This crossover or track intersection 8' may be assumed to be essentially like the intersection shown at 8 in Figure 1, the variation being that main line track continues to the right for the track 3'. Likewise, a three phase trolley is resumed for main line operation at the right for the track shown at 3'. In this structure, the track contacts or third rails 50', 51', 52' and 53 are shown upon the opposite sides of the track from what they are shown in Figure 1. The locomotive is, preferably, provided with contact shoes on each side, so that the location of the track contact, that is, the third rail, is immaterial. The intersecting parts of the track are electrically segregated by means of the insulating joints 46, 47, 48 and 54 and within these insulated joints the rails are bonded together to form the return conductor through the frame of the locomotive. The insulated part of the track is preferably laid on well creosoted ties in rock ballast, in order to limit stray current, as much as possible. The neutral wires 31 and 55 are connected together and are carried on the pole lines or tower lines along the right of way to provide connection from the neutral of the transformer to the track rails for intersections, yards and the like.

The neutral conductors, while they may be substantially at ground potential, are carried in insulated relation over the pole or tower line and to the point where they make connection with the track rails. Such connection between the aerial neutral conductors 31 and 55 and the track rails are shown at 56. The track rails within the insulated joints are bonded together. While the third rails, such as 53, are preferably connected to the neutral conductors, they may have separate connections either to a source of potential or to ground for operating the switchover relay.

The messenger wires or catenary cables for the trolley wires 9A, 9B and 9C are dead ended through strain insulators, as indicated at 60, 60 and the trolley wire conductors are likewise dead ended on strain insulators 61, 61 to the bridge member 62 of the elevated frame structure 36. The trolley conductors, however, are then connected to upwardly extending continuations 63, 63 where they are supported from the upper frame member 64 and then extended horizontally to the opposite upper frame member 64' and connected to a suitable strain insulator and then extended downwardly to connect with the section of the trolley conductors 9B and 9C which, likewise, are dead ended on the opposite frame member 62'. Thus, the outer trolley conductors 9B and 9C serve on main line track as trolley wires and over track intersections serve as transmission lines, whereas the trolley conductor 9A extends throughout as a trolley wire.

The connection between the two outer trolley wires 39B and 39C across the track intersection is made by conductors 65 and 66 led upwardly over insulators mounted upon the cross members 67 and 68.

The central trolley conductor 39A extends throughout as a trolley wire and lies on the same level as the trolley wire 9A above the tracks, the two central trolley wires 39A and 9A intersecting.

As previously explained, where the trolley wires and their messengers for the two outer conductors, such as 9B and 9C, approach the crossover, they are trained upwardly to a position above the central trolley wire, although normally on main line tracks, the two outer trolley wires 9B and 9C preferably lie at a level of the order of six to nine inches below the central trolley wire 9A. By thus extending the outer trolley wires upwardly above the plane of the central trolley wires at an intersection, the contact shoes, later to be described, for the outer phase conductors, are made to clear the intersecting trolley conductor at its track intersection. As will be explained later, the outer trolley collector contacts are not permitted to rise as high as the central collector contacts, with the result that ample clearance is maintained.

In Fig. 3 I have shown a section of main line track with a section of siding in connection therewith. This construction is substantially like the yard or terminal 4, shown in Figure 1, except that herein the siding is served by a three phase trolley 70 beyond the region of a switch 71. The main line track 1 is served by the main line three phase trolley 9, comprising the trolley conductors 9A, 9B and 9C, and connected to the source of three phase current 72, with the grounded neutral 73 connected to the overhead neutral return wire 74, which is carried on insulators on the posts such as 75, 76, 77 and 78.

The post 75 has a cantilever arm 79 for supporting the messenger wires and the trolley wires and from the post 75 to the bridge 80, the messenger wires and trolley wires for the outer two phases are carried above the level of the central trolley wire 9A. The bridge 81 spans both the main track 1 and the siding 82 and the switch lies between said bridges 80 and 81. Between said bridges, the trolley wire 9A is connected to a branch trolley wire 70A, which then is continued on the same level under the bridge 83 and to such further extent as three phase trolley is supplied for the siding 82.

The main line single trolley 9A and the siding single trolley 70A are suitably supported laterally by strain cables 84 and 85 strung between the bridges 80 and 81.

The section of track including the switch 71 for both the main line and the siding is connected to the neutral return wire 74 by a connection 86 extending down along the pole 77 and connected, as indicated at 87 and 88, to the main line track and to the siding within the section of the track defined by the insulating joints 89, 90 and 91. Track contacts 92, 93 and 94 are arranged along the approach to the single phase operating zone, these joints 89, 90 and 91 preferably being placed beyond the track contact to limit, as much as possible, the leakage of return current.

Figure 4:
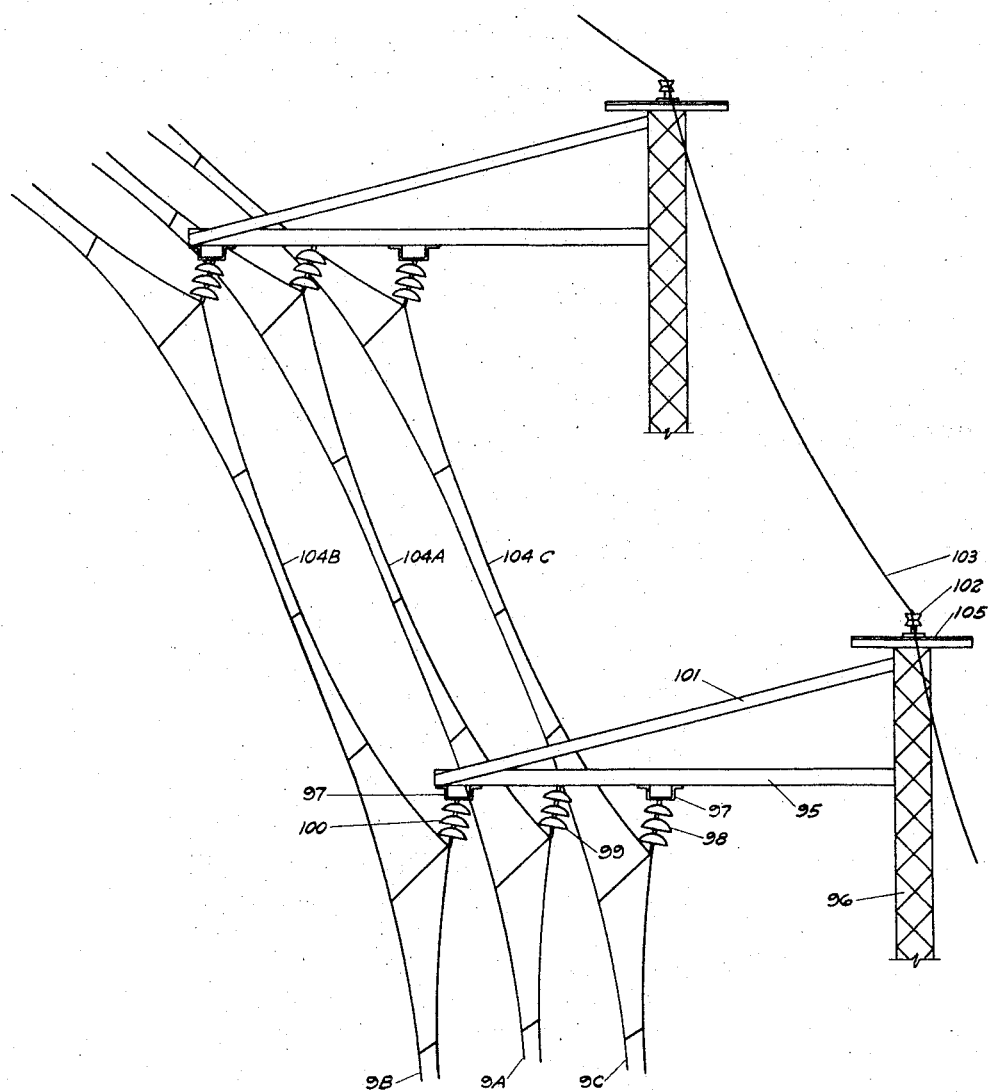
Fig. 4 is a like isometric view of the trolley and its manner of support on a curve.

In Fig. 4 I have shown the manner of mounting the trolley wires 9A, 9B and 9C on a curve. It will be observed that, on the side arm 95 on the pole 96, a spacing block 97 is interposed between the arm 95 and the insulator 98, whereas the insulator 99 for the central trolley wire 9A is connected directly to the arm 95.

Likewise, the trolley wire 9B has a spacing block 97 interposed between the arm 95 and the insulator 100, so that the two outer trolley wires are carried at a common level below the level of the trolley wire 9A.

The arm 95 is connected to a brace or tension member 101 for giving the arm 95 rigidity, the arm 95 and its brace 101 forming a cantilever beam extending from the post 96. The post 96 carries, at its top, an insulator 102 upon which the neutral return wire 103 is carried. By the simple expedient of interposing a spacing block of definite size between the support, such as the cross arm 95 and the insulator 98, and by mounting the three messenger wires, such as 104A, 104B and 104C with equal tension and employing drop wires or rods of suitable length between the catenary cables and the trolley wires the two outer trolley wires may be carried at one level and the central trolley wires carried at a higher level throughout the entire extent of three phase operation. The method of support in Fig. 4 is suitable for curves of long radius.

For normal straight suspension, the mountings shown in Figures 5, 6 and 8 are employed. Spacer blocks made of bar iron, as shown at 111A, 111B and 111C are secured to the horizontal flanges of the horizontal arm 95, which is preferably of I-beam construction. The tension member 101 is preferably an angle bar of smaller section, having its vertical leg secured to the side of the outer end of the bar 95', in the form shown in Figure 5.

The tension member 101 is connected to the outer end of the strut 95' and a bracket 108 extends down to the beam 95 to provide the necessary space for the pin type insulators 112A, 112B and 112C upon which the catenary cables are mounted. The metal cross arm 105 below the insulator 102, which carries the neutral return conductor 103 is employed, preferably, for mounting signal wires and railroad communication circuits.

For double track operation, instead of a cantilever arm, a bridge member, such as 106 preferably of I-beam construction, is carried from post to post, as between the posts 107—107 and diagonal braces 109 extend from the posts above the cross members 106 towards the center of the bar 106 to carry in tension a part of the load of the cross piece 106. A bracket 108' is connected between the tension bars 109 and the beam 106 to provide clearance for the pin type insulators carrying the catenary cables 104A, 104B and 104C.

Fig. 6 shown in detail the structure for holding the trolley conductors against lateral vibration. An insulator such as 110B is supported below the bar or beam 95 in this case through the intermediary of the spacer 111B and upon the bottom of said insulator 110B a pair of parallel T bars are mounted in parallel relation and spaced apart to receive between them the suspension rods 124—124 that suspend the trolley conductor 9B from the catenary cable 104A. Lateral swaying of the trolley conductor is thereby limited or prevented.

In Figs. 9 to 12, I have illustrated one form of collector which may be employed with the foregoing trolley, this form of collector comprising three poles 115, 116 and 117 connected together through the cross bar 118, which is connected to the central pole 115 and connected through a lost motion connection 119 and 120 to the poles 116 and 117, respectively.

The lost motion connections 119, 120, in each case comprise a means for permitting slight independent motion in a vertical direction of either of the poles 116 and 117, with respect to the central poles 115, but compelling common angular motion about the vertical pivots. The poles 115, 116 and 117 are mounted to swing on horizontal axes 121, 122 and 123, which are all in alignment when the locomotive 125 is running on straight tracks.

The poles are likewise pivoted on vertical axes 126, 127 and 128, so that the three poles may swing around together. The cross bar 118 is pivoted at 129 to the plate 130 for limited angular motion. If desired the pivot 129 may be eliminated and a rigid connection employed instead. Suitable spring tension is applied to the poles to carry them into contact with the wires 9A, 9B and 9C.

The central pole 115 has a guiding or controlling shoe 131 and the poles 116 and 117 have pan collector shoes 132 and 133. The central or controlling shoe 131 has a groove therein which embraces the central trolley wire 9A and thereby the entire collector is guided in register with the trolley wires.

The central or guiding trolley pole 115 preferably is formed of two members braced together to give the pole rigidity, which is required for its guiding function.

As the collector approaches a single phase section of the trolley where the two outer wires 9B and 9C are trained upwardly above the level of the central trolley wire 9A, the connecting bar and the couplings 119 and 120 prevent the rise of the two outer trolley poles 116 and 117, so that they always remain below the level of the collector shoe 131 and, hence, for an intersecting or branch single phase trolley wire no interference of the shoes 132 and 133 with the single phase trolley or its branch or intersecting wire can occur.

The locomotive shown in Figure 9 has a collector at each end for operation in corresponding directions.

The collector scheme may be employed on a single phase two trolley wire system or a three phase two trolley wire system where the through trolley wire, such as 9A, would control the position of one of the trolley poles for the other wire cooperating with its trolley wire. In such case one trolley conductor is continued straight through the intersection zone and the other is discontinued as a trolley conductor and is connected to the rails or to a third rail for two wire single phase or merely discontinued on a three phase grounded system.

In Figures 13 to 31 I have shown a pantograph mechanism with automatic means for maintaining the same in alignment with the track. The trolley wire or wires may be aligned with the track and, hence, by the compensating mechanism herein disclosed, the pantograph shoes or pans may be maintained in accurate alignment with the trolley wires.

Figure 19:
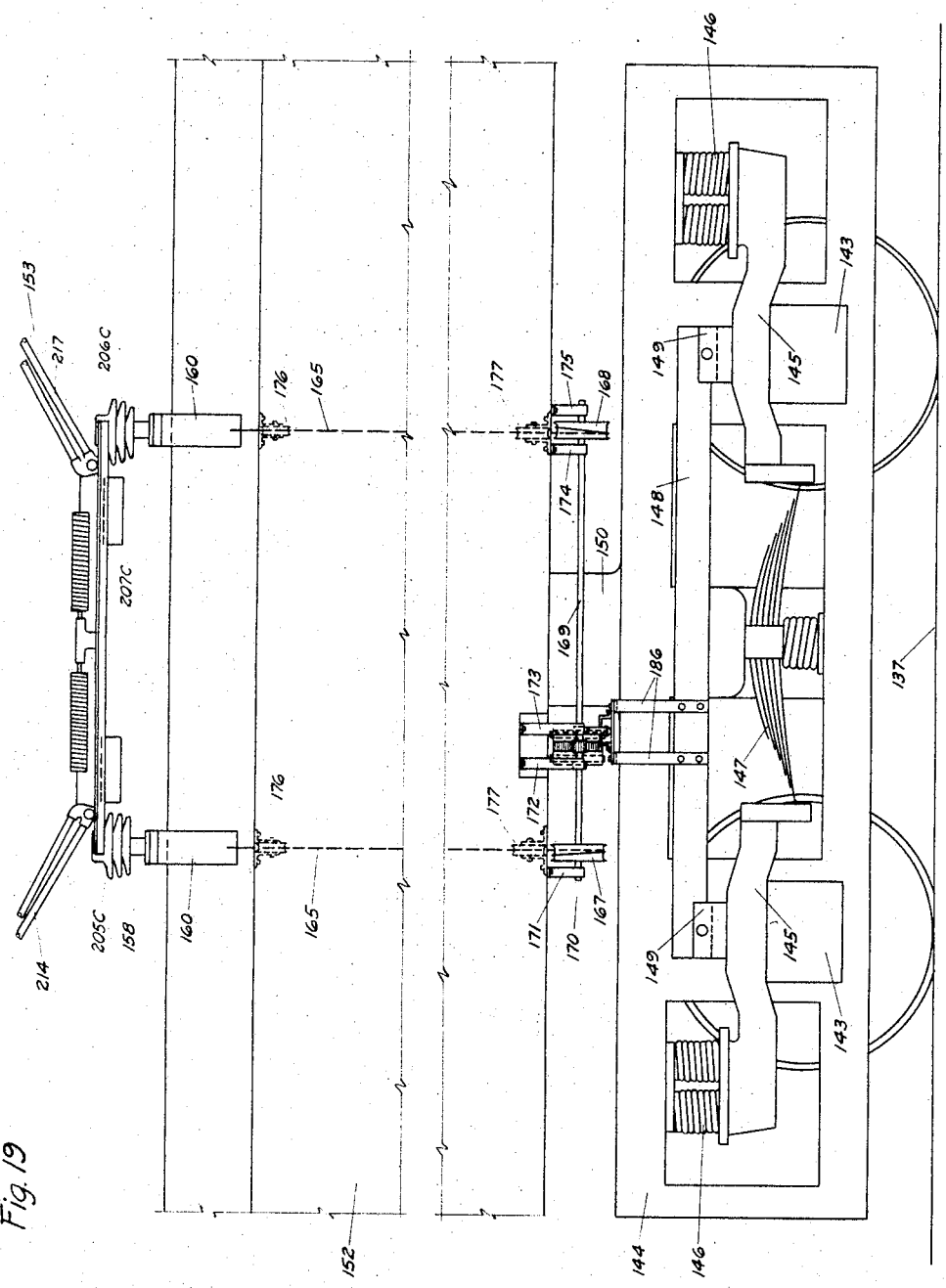
Fig. 19 is a side elevational view of the pantograph carriage and the equalizer for controlling the position of the pantograph.
Figure 20:
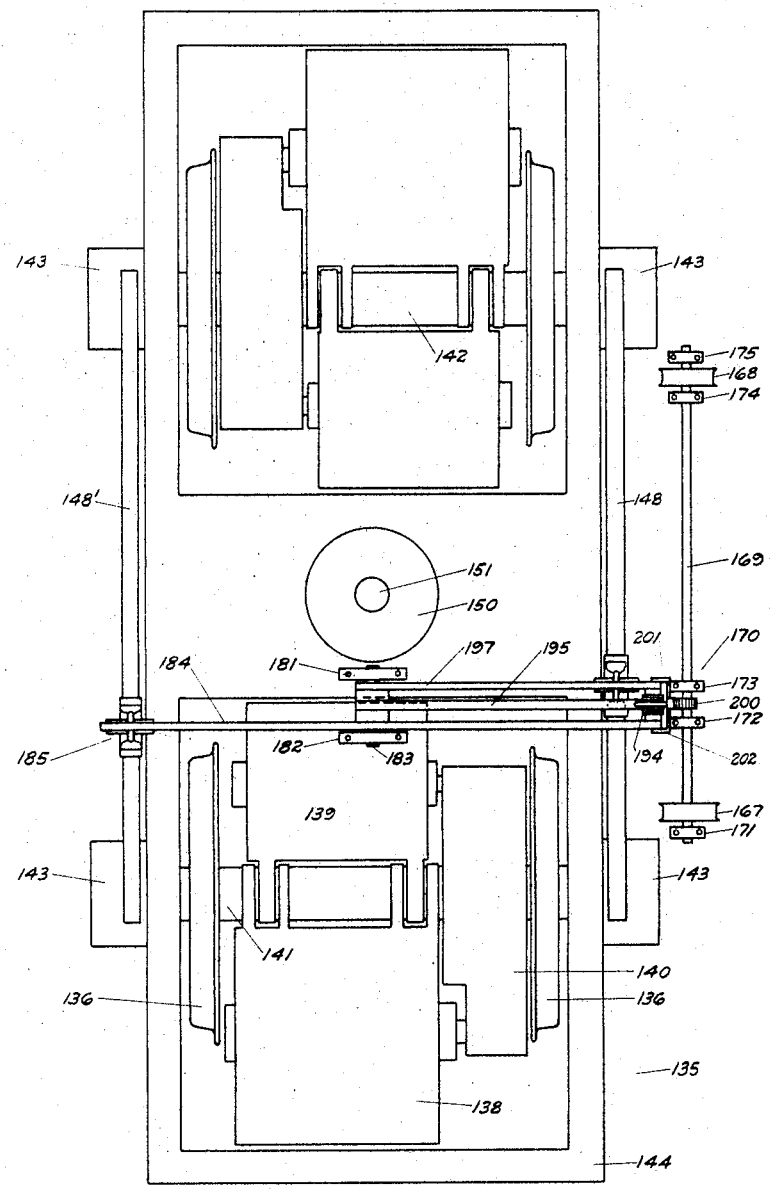
Fig. 20 is a top plan view of the equalizer mechanism.
Figure 21:
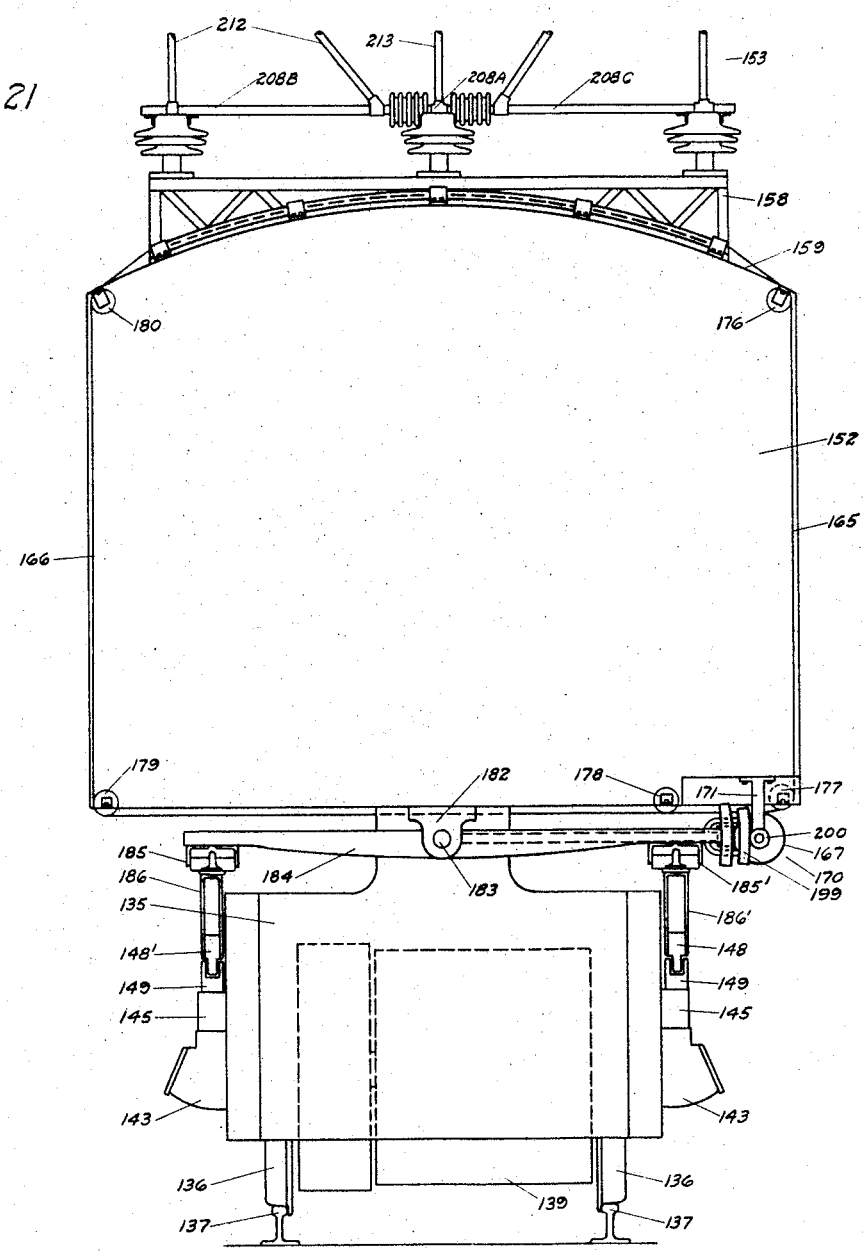
Fig. 21 shows the equalizer mechanism in central position and connected to the carriage.

Referring, first to Figures 20 and 21, it will be seen that the locomotive comprises the trucks 135 at front and rear. These trucks have flanged wheels 136 running on the track rails 137. Through suitable motors 138 and 139 drive is transmitted through a differential gear 140 to the axle 141 bearing the wheels 136. The axles 141 and 142 are mounted in suitable journal boxes, such as 143, connected by a suitable spring suspension shown in Figure 19 to the frame 144. The equalizing levers 145 mounted upon the boxes 143 and cooperating with the springs 146, 146 and 147 move with the journal boxes and, hence, with the wheels. A bar 148 is mounted upon the lugs 149, 149 on said levers 145 so that the bar 148 moves, at all times, up and down with the wheels 136 and, hence, parallel to the rail 137.

The frame 144 has a bearing boss 150 and a king pin connection 151 to the body 152. The locomotive is preferably supported upon two such trucks, as illustrated, for example, in Figure 9. Suitable side bearing plates between the body 152 and the truck frame 144 may also be provided, as is known to those skilled in the art. Since the frame 144 is slidably connected to the boxes 143 on the journals 141 and 142, the frame is capable of an independent motion with respect to the rails, through the flexibility of the springs. Also, there may be some lost motion in the king pin connection. It is well known that, as a locomotive proceeds along the rails, particularly at higher speed, the body sways, principally due to inequalities of the track. If the collector, in this case, the pantograph 153, were mounted rigidly on the roof of the locomotive body 152, it would partake of the swaying motion of the body with resultant difficulty of maintaining the collector pans in register with the trolley wires. Due to the fact that the pans 154, 155 and 157, as shown in Figure 13, can occupy only about three-fourths of the space usually occupied by a pantograph collector pan, these contacts must be guided more closely.

I have mounted the pantograph mechanism and contact upon a base or platfrom 158, which is movable with respect to the roof or top surface 159 of the body 152.

The roof 159 is cylindrical on a radius, which has its center approximately at the spring suspension, about which the body rocks or sways.

By suitably shifting the base frame 158 with respect to the roof of the car, the collector or pantograph may be maintained in alignment with the track and, hence, in alignment with the trolley. While I have shown this arrangement as particularly useful in connection with three phase trolleys, it may be employed for use with two trolley wires, as for example where three phase power with two phases carried as trolley wires overhead and one phase grounded or two trolley wires in a single phase system are employed. Such a two wire trolley collector is shown more particularly in Figs. 16, 17 and 18. It could, of course, be applied to a single overhead trolley wire, but the same is not now considered necessary. The base frame 158 is generally rectangular in outline with a curved concave lower guiding rail at each end, as shown in Figs. 29 and 30. The concave rail is preferably formed in the shape of a channel bar curved to the proper radius and running upon rollers 161, which in turn, are mounted on pins 162 fastened in the flanges of a convexly curved channel bar 163, which channel bar 163 is secured to the roof 159 of the car body 152. A series of rollers 161 is thus disposed along the length of the curved channel member 163, so as to provide an antifriction mounting for the base frame 158.

To take up the thrust endwise of the car, that is, to prevent tilting fore and aft of the base frame 158 angle cleats 164 are secured to the roof 159 and extend over the curved member 160, to prevent rise of the same. The channel bar 160 thus forms a raceway cooperating with the rollers 161.

Now, by reference to Figures 19, 20, and 21, there will be seen the cables 165 and 166 fastened at the sides of the base frame 158, at front and rear, and connected to the cable drums 167 and 168 of the compensating mechanism 170. The cable drums are supported on a shaft 169, which in turn, is journalled in brackets 171, 172, 173, 174 and 175, mounted at one of the lower side edges of the locomotive body 152. The cables 165 and 166 are trained over sheaves 176, 177, 178, 179 and 180. Along the sides the cables are preferably disposed within the outline of the car or locomotive body, to prevent accidental engagement of the same with an object brushing the side of the locomotive body. On the bottom of the locomotive body, adjacent the king pin connection 151, I mount two bracket members 181 and 182 (see Figs. 20 and 21) supporting a bearing pin 183 lying in the central vertical plane of the body in a horizontal position, these brackets being secured up against the bottom of the body 152. Upon the bearing pins 183, three levers are pivotally mounted. The lever 184 is pivoted at its center on the pin 183 and, at the left, see Figures 20 and 21, it is connected to the side bar 148' through a coupling 185, which permits angular motion of the trucks with respect to the body, without interfering with the angular relation of the lever 184 between the body 152 and the side bar 148'. This coupling 185 is shown in detail in Figures 26, 27 and 28. It comprises a yoke member secured to the brackets 186 mounted at their lower ends on the side bar 148, the couplings 185 and 185' are alike. The yoke comprises a bearing plate 187 of convex section, as indicated at Figure 27, and a bail 188, preferably of cylindrical form along the center and flattened at the ends to permit securing of the ends of the bail and of the bearing plate 187 to the brackets 186, as by means of rivets or bolts, indicated at 189.

A roller 190 is mounted on a pin or shaft 191, supported by the brackets 192 which have their bases connected to the end of the lever arm 184.

It can now be seen that if the locomotive truck should be moved angularly, with respect to the body, as in going around a curve, the lost motion which is provided by the bail 188 would permit the lever to maintain its fixed relation with respect to the body 152, so that the roller could move within the bight of the bail 188. As will appear later, if the body should bounce up and/or down, a certain degree of angular play of the lever 184, with respect to the bail 188 is to be permitted, and for this reason, the bearing plate 187 and the bail 188 are rounded to permit this angular motion without appreciable play.

At the right hand end of the lever 184, as viewed in Figures 20 and 21, there is mounted a gear sector 193 co-operating with the conical pinion 194, (see Figs. 23—24—25). The pinion 194 is journalled on a shaft on the outer end of the lever 195, which lever, at its left end, is pivoted on the shaft 183. The pinion 194 is held between the gear sector 193 mounted on the right hand end of lever 184 and the companion gear sector 196, mounted on the right hand end of lever 197, which is also pivoted on shaft 183. The pinion, itself, is idle and serves merely to carry the lever 195 up or down, as the case may be, under the relative motion of the gear sectors 193 and 196. The lever 195 carries a cage 198 bearing a gear sector or quadrant 199 meshing with the gear 200 which is keyed to the winding shaft 169, which shaft bears the winding drums 167 and 168. The cage 198 carries side plates 201—202 forming an enclosure or housing for the pinion 194.

The lever 197 is connected through a lost motion connection 185', which in all respects is like the connection 185 for the left hand end of lever 184. The connection 185' is interposed between the lever 197 and the side bar 148. The lever 197, therefore, at its right hand end partakes of the guidance of the rail 137 and, at its pivotal end, at the left, partakes of the motion of the body 152.

The gear sector 199 is guided by guides 201, 202, secured to the outer ends of the levers 197 and 184, bearing against the sides of the gear sector, as may be seen in Figs. 19 and 23. These guides are shown in section in Figures 24 and 25, but they have been omitted from the other views, except as above mentioned, for the sake of clearness.

The cables 165 and 166 are connected to the pantograph base frame 158 and to the cable drums 167 and 168, with the result that rotational motion of the shaft 169 and drums 167 and 168 results in a shifting of the pantograph base in the guides on the roof of the car.

Now it can be seen that the pinion 194 partakes of the differential motion between the sectors 193 and 196. In Figure 22, I have shown the operation of the compensator 170, under the conditions that the body 152 sways to the right on the springs to give an angular displacement, as indicated by angle $x$.

It can be seen that the pivot pin 183 moves laterally to the right and, hence, the rollers 190 and 190' on the levers 184 and 197, respectively, slide to the right in the bails 188 and 188', but in so doing have no effect, of themselves, upon the compensating mechanism 170. The pinion 194 and the gear sector 199 do not change their positions vertically, but the cable drum shaft 169 and the pinion 200 thereupon are lowered with respect to the gear sector or rack 199, with the result that motion of the shaft 169 downwardly results in a rolling of the pinion 200 upon the sector or rack 199 and an angular motion of the drums. This angular motion is translated into a shifting of the cables 165 and 166 and of the pantograph base frame 158 and, with it, the pantograph collector 153. The parts are so proportioned that the resulting motion of the base frame 158, with respect to the body 152, is such as to maintain the pantograph frame in alignment with the rails 137, 137 and, hence, with the trolley wires 9A, 9B and 9C. The compensating mechanism 170 may be considered, therefore, as means for permitting the pantograph to be guided by the track independently of the motion of the body. The natural inertia of the pantograph mechanism and its base frame tends, of course, to keep it in alignment and this works with the compensating mechanism, so that a minimum of effort is required to keep it guided.

Referring, now, to Figure 31, I have shown the body as depressed on the springs. In this case, the body 152 is carried downwardly as, for example, by the distance indicated at $y$ in the center of the body. This carries the pin 183 downwardly by a like distance, resulting in downward motion of the gear sector 193 on the right hand end of the lever 184.

The pinion 194 which meshes between the gear sectors 193 and 196 and is carried on the right hand end of the swinging arm 195 is, of course, subject to the motion of the gear sectors 193 and 196. In the present case, the downward travel of the gear sector 193 is exactly neutralized or counteracted by the upward motion of the gear sector 196, with the result that the pinion 194 does not change position with respect to the locomotive body 152, although it is rotated. Since it does not change its position, that is, vertically, no movement of the gear sector 199 results and, hence, no motion of the winding shaft or the drums or the cables results and the pantograph collector 153 is merely carried downward with the body, the spring means of the collecting pans, to be described later, taking up the vertical play.

The compensating mechanism 170 can be seen, therefore, to compensate for either swaying motion on the springs or for vertical motion on the springs. It is obvious that, while I have described angular motion to one side in connection with Figure 22, angular motion to the other side would be no different. Likewise, while I have described downward motion of the body 152 in respect to Figure 31, upward motion of the body would operate in like manner. Since each component is taken care of, that is, components at right angles to each other, any motion which is a combination or resultant of such motion will, likewise, be compensated for.

The character of the current collector per se may be varied without reference to the compensating mechanism. While in Figures 13, 14, 15, 22 and 31, I have shown a three phase current collector, the compensating mechanism is equally applicable to a current collector cooperating with two trolley wires instead of three.

I shall now describe the pantograph mechanism, which is mounted upon the base 158. The base frame 158 has a group of insulators 205 at the front part of the frame 158 and 206 at the back part of the frame and these insulators are tied together in pairs by pairs of angle bars 207, having their upper flanges disposed in substantially a common plane and upon these pairs of angle bars, there are mounted at front and rear rotatable shafts or rods 208 divided into sections 208A, 208B and 208C, insulated from each other by insulators 210 and 211. The parts of the rods 208 at front and rear are identical and a description of one will suffice for both. The front rod 208 has connected thereto a series of arms 212, 213 and 214 and, likewise, at the rear, as shown in Figure 15, there are provided the arms 215, 216 and 217. These three arms being mounted upon sections of the rod 208 are, therefore, insulated from each other. The arms 212, 213 and 214 are hinged to cooperating arms 218, 219 and 220. Likewise, at the rear, the arms 215, 216 and 217 have the converging arms 221, 222 and 223 hinged thereto. A common rod or shaft 225, which is composed of insulator sections 225A, 225B and 225C, separated by insulators 226 and 227, form a common hinge pin for the upper converging arms of the three phases.

The arms 221 and 218 for the A-phase converge upon the shaft section 225B. The arms 219 and 222 converge upon the shaft section 225A of the A-phase and the arms 220 and 223 converge upon the shaft section 225C for the C-phase. Thus the upper ends of the converging arms all pivot on the same action. Shoes or pan collectors for the different phases are shown in plan view in Figure 15. These shoes or pans comprise elongated contact members pivotally mounted upon the shaft 225 and suitably urged outwardly by coil springs.

For the A-phase, there is a sub-frame pivotally mounted upon the shaft section 225A, as will be best understood from Figure 14. This sub-frame comprises a downwardly extending arm 229 and arms 230 and 231, extending toward the front and rear, respectively. The arms 230 and 231 are preferably tied together by a tie bar or rod 232. The arms and the tie rod support rods or shafts 233 and 234 and upon these rods the contact members 155 and 156 are pivotally swung on short arms or lugs 235 and 236, respectively. Coil springs connected between the shaft 234 and said arms 235 urge the collector pan 156 to move upwardly or in a counterclockwise direction, as viewed in Figure 14 and likewise coil springs connected between the shaft 233 and the arm 235 urge the contact 155 in like manner so as to maintain an effective contact between the collector pan and the trolley wire 9A.

Suitable stop shoulders may be provided for limiting the upward motion of these arms and their pans. In like manner, contact pans 157B and 157C are mounted on arms 237B and 237C upon the common shaft 225. Likewise, coil springs upon said shaft sections of the shaft 225 urge the contact pans 157B and 157C upwardly to make engagement with the trolley wires 9B and 9C, respectively. The subframe for the several pans 155 and 156 is held in central position by a pair of springs 238 and 239 connected between the arm 229 and the converging frame members 222 and 219.

The pantograph frame, itself, is held in extended position or is urged into that position by pairs of springs 242 and 243 on opposite sides of the frame, these springs being connected between central blocks 240 and 241 which, in turn, are connected to the side bars 207B and 207C and the rocking shaft 208, to which the lower arms of the pantograph are connected.

These springs 242 and 243 preferably are connected through cords and pulleys or cams to the shaft 208, serving to raise the lower arms and swing them toward each other, thereby forcing the upper converging arms to rise.

As may be seen in Figures 13 and 15, the central pans 155 and 156 have insulating extensions 244 at each end, these extensions being carried down below the level of the pans 154 and 157 sufficiently to furnish a guide for preventing catching of a trolley wire, such as a branch of the trolley 9A as, for example, at a track turnout or the like. Where, for example, the locomotive is operating on single phase and crosses over a track switch, it will be seen that the branch of the central trolley wire 9A will have lateral motion with respect to the pans 155 and 156 and it is desirable to provide these extensions 244 so as to prevent any accidental catching of such branch or any other wire under the edges of the pans 155 and 156.

In like manner, the pans 154 and 157 have their outer edges extended downwardly to form an incline for a wire which may ride upon the pans and at their inner ends the pans have a slight rise to cooperate with the depending insulating portions 244 of the central pans.

Cooperating air cylinders for lowering the pantograph and for varying the effective pressure of the same upon the trolley wires, as disclosed in my copending case Serial No. 357,539 may be employed in conjunction with the above pantograph.

Figure 16:
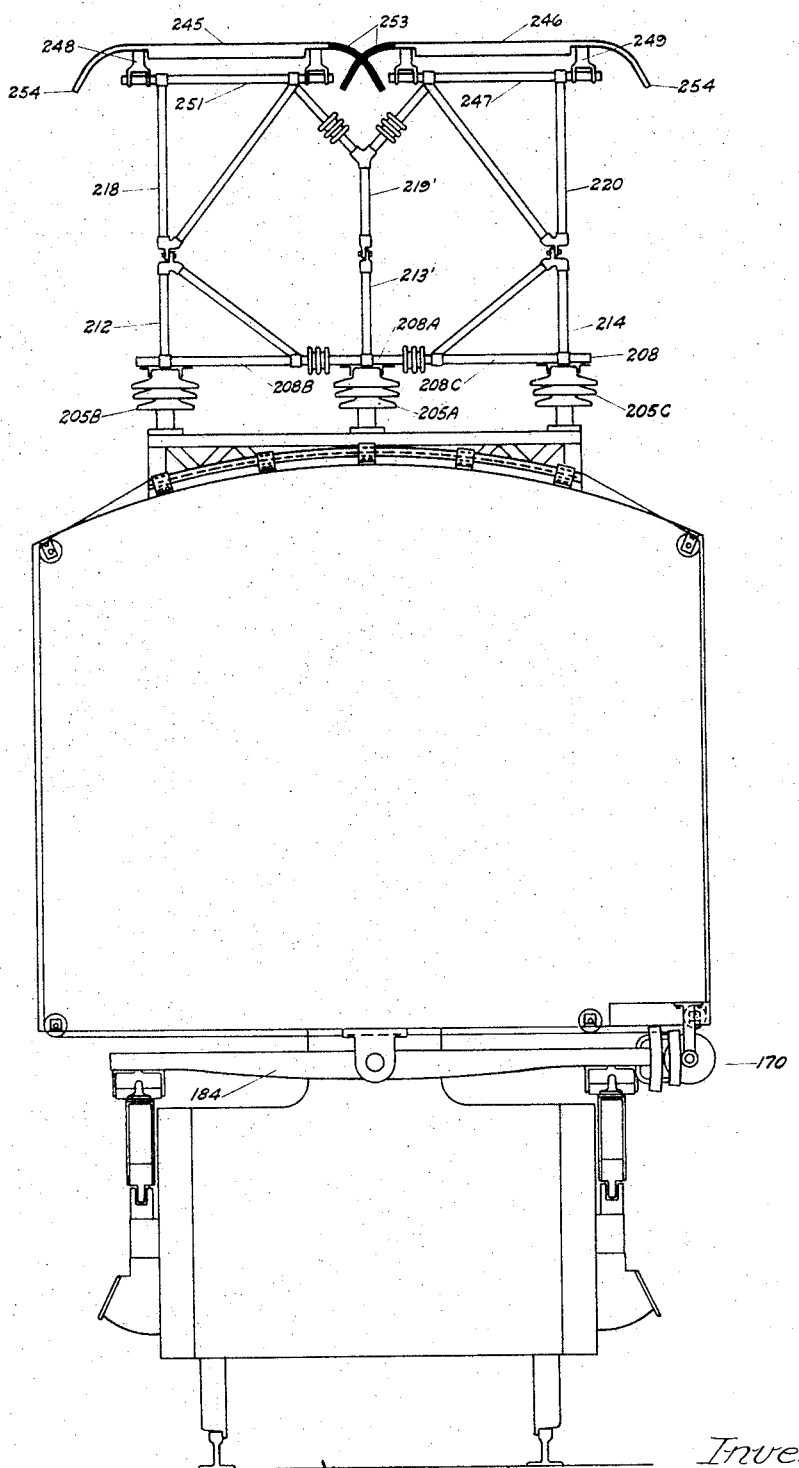
Fig. 16 is an end view of a two contact pan collector such as may be used for single phase or for three phase where one phase is grounded.
Figure 17:
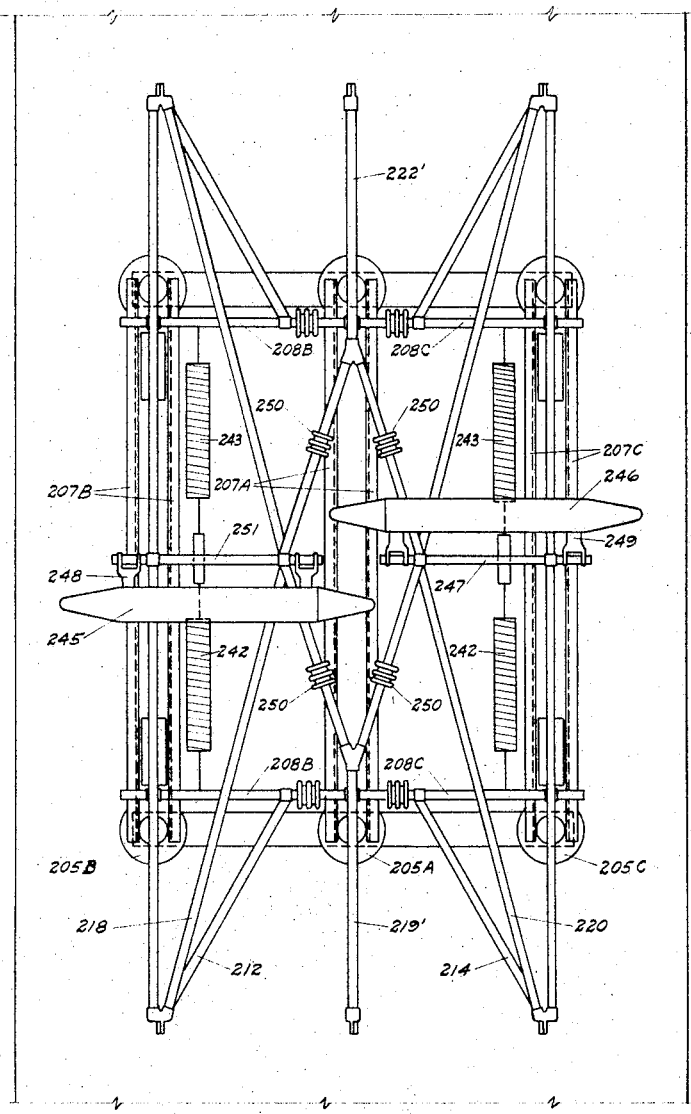
Fig. 17 is a top plan view of the collector shown in Fig. 16.
Figure 18:
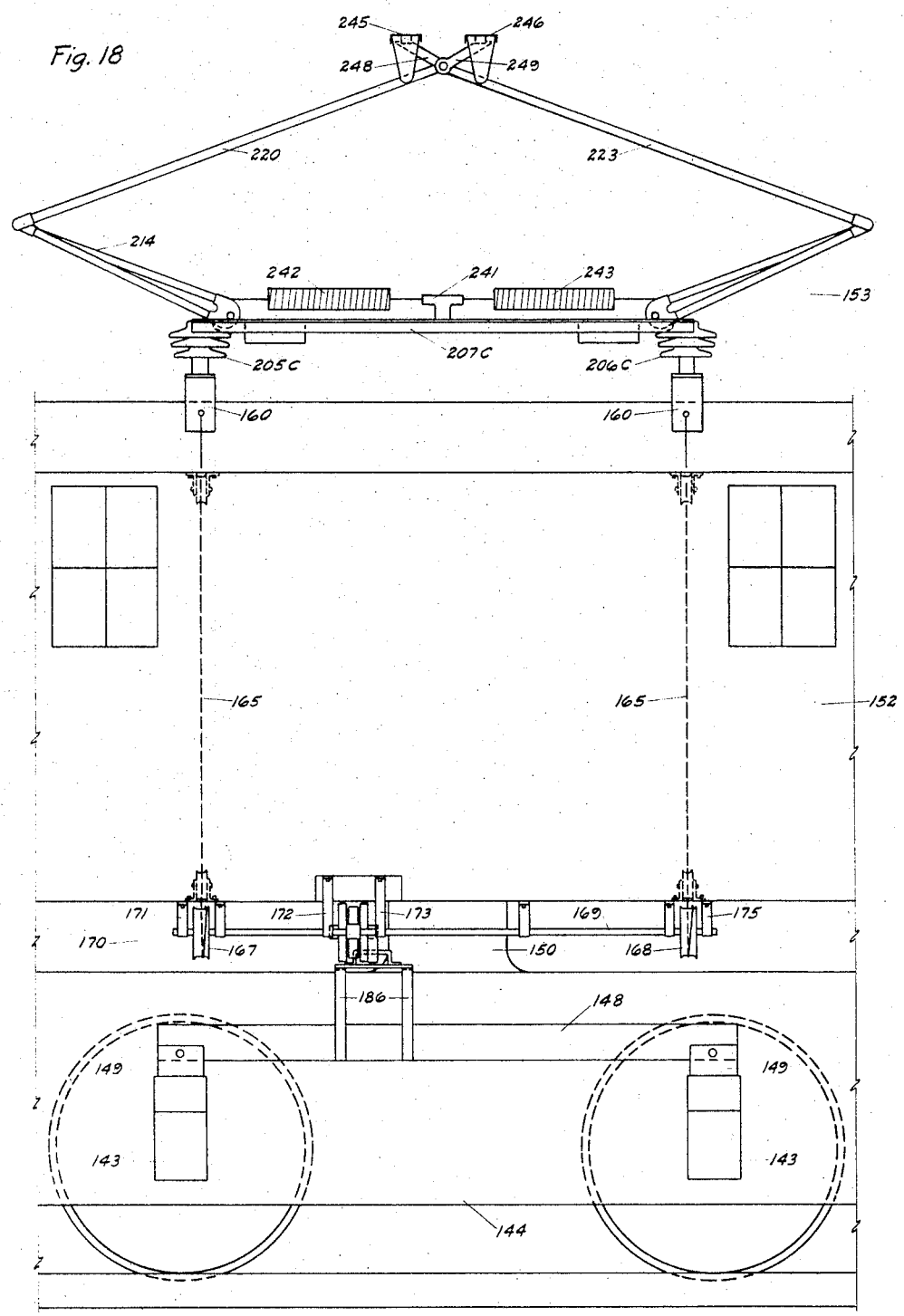
Fig. 18 is a side elevational view of the pantograph collector shown in Figs. 16 and 17.

In Figures 16, 17 and 18, I have shown a pantograph collector for cooperating with two trolley wires, such as may be employed in a two wire single phase system or in a two wire and ground three phase system. The construction of the pantograph is essentially the same as disclosed in connection with Figure 1, except that the pantograph is narrowed and is adapted for two collecting pans instead of three. In this case, collecting pans 245 and 246 are shown as mounted on rods or shafts 251 and 247 on the same axis and are hinged in opposite directions upon arms 248 and 249, respectively, and adapted to rise to substantially the same height. If desired, the pans 245 and 246 may be arranged to cooperate with trolley wires on different levels for the advantage herein set forth of continuing one of the wires through track intersections without interference from the collector of the wire which occupies normally the lower level.

In the pantograph shown in Figures 16, 17 and 18, the central lower arm 213 is substantially like that of the three phase pantograph, but the upper arm 219' includes the insulators 250 in the branches at the upper end of said arm 219, which run to the shafts 251 and 247. The same is true of the middle arms at the rear, namely, the lower rear arm 216 is like the three phase arm 216 and the upper rear arm 222' is branched to the shafts 251 and 247 and contains insulators 250.

Springs upon the shafts 251 and 247 acting upon the arms 248 and 249 that support the pans 245 and 246 tend to swing said pans upwardly into engagement with the trolley conductor. Suitable stops may be provided on the arms 248 and 249, cooperating with the shafts 251 and 247 to limit the upward throw of the said pans.

The elevator springs 242 and 243 on each side cooperate with the corresponding shaft sections at front and rear, 208B and 208C, for urging the pantograph upward yieldingly.

The inner ends of the pans 245 and 246 have insulating extensions 253 in overlapped relation, that is, extending beyond the median line of the pantograph, so that the branch wire from one may ride over these insulating extensions onto the other without injury. The outer ends of the pantograph shoes are turned down, as indicated at 254, to assist a conductor in riding over the edge onto the pans. The use of the compensating mechanism in conjunction with the two trolley conductor pantographs is indicated at Figures 16 and 18. It is believed that the operation of the several forms of pantograph shown is clear in each case from the detailed description above.

I do not intend to be limited to the details shown or described.

I claim:

1. In combination a three phase trolley having a central trolley conductor disposed above the outer trolley conductors, said outer trolley conductors being disconnected at a track crossover or turnout and the central conductor being continuous past the crossover or turnout, a current collector cooperating with the trolley comprising a central contact shoe and shoes on each side thereof, and means for preventing the rise of said outer shoes where they pass off of the outer trolley conductors for crossovers and turnouts.

2. In combination with overhead supporting means, a three phase trolley comprising two outside phase conductors and a central phase conductor above said outer phase conductors, and a pantograph collector having separate collector shoes cooperating with each of said trolley conductors, the outer shoes being limited from rising to the level of the central trolley conductor.

3. The combination with an overhead insulating support of a three phase trolley comprising three substantially parallel phase conductors adapted for sliding contact, one of said conductors being disposed at a higher level than the other conductors, and a pantograph collector having separate shoes cooperating with each of said phase conductors, the shoes cooperating with the conductors at a lower level being prevented from rising to the level of said one conductor.

4. In combination with overhead supporting means of a three phase trolley comprising two outside phase conductors and a central phase conductor above said other phase conductor of a pantograph collector having separate shoes cooperating with each of said trolley wires and a vehicle supporting said pantograph collector, said pantograph collector being movable laterally relative to the vehicle.

5. In combination, a railway track, a motor car on said track, a trolley supported over said track and in alignment with the same, said trolley comprising a plurality of separate phase conductors, a current collector mounted on said motor car and having separate shoes cooperating with the conductors of the trolley, and means for guiding said collector from the tracks independently of the motion of the body to maintain alignment of the collector shoes with the conductors.

6. In combination, a railway track, a trolley in alignment with said track, a motor car running on the track, said car having a body mounted on springs, a collector mounted on the body, said collector having a shoe engaging a conductor of the trolley, and means for guiding said collector from the track independently of the motion of the body.

7. In combination, a track, a trolley comprising a plurality of trolley wires in parallel alignment with each other and with the track, a motor car running on the track and having a body, a pantograph collector mounted on the body, said pantograph collector having shoes individual to the trolley wires for cooperation therewith, and means for guiding said pantograph in alignment with the track independently of the swaying of the body.

8. In combination, a track, a trolley comprising a plurality of trolley wires in parallel alignment with each other and with the track, a motor car running on the track and having a body, a pantograph collector mounted on the body, said pantograph collector having shoes individual to the trolley wires for cooperation therewith, and means for guiding said pantograph in alignment with the track independently of the swaying of the body, said means comprising a compensating device for moving said pantograph laterally with respect to the body when the body deviates from normal central position.

9. In combination, a track, a multi-conductor trolley comprising a plurality of trolley wires in alignment with the track, a car running on the track, said car comprising an axle and a body, a current collector having individual shoes cooperating with the individual trolley wires, said collector being mounted on the body and being laterally movable with respect to the body, and a compensating gear actuated by movement of the body relative to the axle for maintaining the collector in position to keep the collector shoes in alignment with the trolley wire.

10. In combination, a track, a multi-conductor trolley comprising a plurality of parallel trolley wires, a motor car running on the track, said motor car comprising an axle and a body, a spring mounted on the axle, a current collector having individual shoes for cooperation with the separate trolley wires, said current collector being movably mounted upon the body, and means for maintaining the current collector with the shoes in alignment with the trolley wires independently of the motion of the body relative to the axle.

11. In combination, a track, a multi-conductor trolley over the track, a car running on the track, said car comprising a truck and a body spring mounted on the truck, a current collector having shoes for each of the conductors of the multi-conductor trolley, said collector having a frame mounted upon the top of the body, and means for guiding said frame in alignment with the track independently of the motion of the body.

12. In combination, a car comprising an axle and a body adapted for limited motion with respect to the axle, a current collector having a frame mounted on top of the body, said current collector being movable transversely to the body, and means for maintaining the current collector in alignment with the axle independently of the motion of the body relative to the axle.

13. In combination with a locomotive body, a transverse track on the top of the body, a collector frame movable on said track, an extensible collector mounted on said frame and having a current collecting shoe adapted for cooperation with a trolley wire, and automatic means for moving said frame transversely on said track.

14. In a motor car, an axle, a body mounted on the axle and adapted to have limited relative motion with respect to the axle, said body having a current collector frame mounted upon the same, said frame being movable transversely relative to the body and a compensating gear connected between the body and the axle for controlling the position of the collector frame upon the body.

15. In combination, in a motor car, an axle, a body adapted for relative motion with respect to the axle, a collector frame mounted on the body, said collector frame being movable transversely with respect to the body, a compensating gear connected between the body and the axle and a connection between the compensating gear and said collector frame, said compensating gear being energized by swaying of the body with respect to the axle for moving the collector frame.

16. In combination in a motor car, an axle, a body mounted thereupon and adapted for relative motion with respect thereto, a collector frame mounted on the body and movable with respect to the same, a compensating gear connected between the body and the axle, and a cable between said compensating gear and said frame for moving the collector frame relative to the body to maintain the collector frame in predetermined alignment with the axle.

17. In combination in a motor car, an axle a body mounted thereupon for limited motion with respect thereto, a collector frame mounted on the body, levers connected to the body and to the axle, gears connected to said levers and partaking of the relative motion of the body with respect to the axle, an idler controlled by said gears, means controlled by relative motion of said idler with respect to the body for moving said collector frame.

18. In combination in a motor car, a truck, a body having limited motion relative to the truck, a collector frame mounted on the body, cables for moving the collector frame with respect to the body, a winding shaft controlling said cable, levers connected between the body and the frame, means subject to the additive or subtractive action of said levers for controlling the movement of said winding shaft.

19. In a compensating device, a winding shaft having a drum, a flexible element connected to the drum, a pinion on the winding shaft, a gear member cooperating with the pinion, a cage connected to the gear member, a pinion in said cage, a pair of movable levers and differential gear members connected to said levers and meshing with said pinion.

20. In a compensating mechanism, a pair of members relatively movable with respect to each other, a pivot mounted on one of the members, a winding shaft mounted on said members, levers pivoted on said pivot member and connected to the other members of said relatively movable members, differentially movable gears connected to said levers, an idler connected to said differential gears, a movable cage for the idler, a gear sector connected to the cage, and a pinion meshing with the gear sector and mounted on the winding shaft.

21. A plural phase pantograph comprising a base frame, a plurality of collapsible linkages comprising shaft sections, said shaft sections being connected together through insulators, spring means for extending said collapsible linkages in unison, and collector pans individually mounted upon the linkages.

22. A pantograph for a multi-conductor trolley, comprising a collapsible frame consisting of a plurality of sections mechanically connected in insulated relation, and individual collector shoes mounted on said sections, said collector shoes extending in overlapping relation to prevent the dropping of a trolley wire between them.

23. A pantograph for a multi-conductor trolley, comprising a collapsible frame consisting of a plurality of sections mechanically connected in insulated relation, and individual collector shoes mounted on said sections, said collector shoes extending in overlapping relation to prevent the dropping of a trolley wire between them, one of the extensions of the overlapping collector shoes being formed of insulating material.

In witness whereof, I hereunto subscribe my name this 5th day of April, 1929.

ALLEN M. ROSSMAN.